United States Patent
Siegel et al.

(10) Patent No.: US 10,830,908 B2
(45) Date of Patent: Nov. 10, 2020

(54) APPLYING MOTION SENSOR DATA TO WHEEL IMBALANCE DETECTION, TIRE PRESSURE MONITORING, AND/OR TREAD DEPTH MEASUREMENT

(71) Applicant: Massachusetts Institute of Technology, Cambridge, MA (US)

(72) Inventors: Joshua Eric Siegel, Bloomfield Hills, MI (US); Rahul Bhattacharyya, South Portland, ME (US)

(73) Assignee: Massachusetts Institute of Technology, Cambridge, MA (US)

( * ) Notice: Subject to any disclaimer, the term of this patent is extended or adjusted under 35 U.S.C. 154(b) by 464 days.

(21) Appl. No.: 15/639,192

(22) Filed: Jun. 30, 2017

(65) Prior Publication Data

US 2018/0003593 A1 Jan. 4, 2018

Related U.S. Application Data

(60) Provisional application No. 62/356,673, filed on Jun. 30, 2016.

(51) Int. Cl.
*G01S 19/49* (2010.01)
*G01M 1/22* (2006.01)
(Continued)

(52) U.S. Cl.
CPC ............ *G01S 19/49* (2013.01); *B60C 11/246* (2013.01); *G01H 1/00* (2013.01); *G01H 17/00* (2013.01); *G01M 1/225* (2013.01)

(58) Field of Classification Search
CPC ...... G01M 17/02; B60C 11/246; B60C 23/02; G01H 17/00; G01S 19/14; G07C 5/0808; G07C 5/0816
(Continued)

(56) References Cited

U.S. PATENT DOCUMENTS 3,604,249 A * 9/1971 Wilson ................ G01M 17/025
73/582
5,753,809 A * 5/1998 Ogusu .................. B60C 23/061
340/442

(Continued)

FOREIGN PATENT DOCUMENTS

JP  2008039708 A * 2/2008
KR  20010061950 A * 7/2001 ......... B60C 23/0408

OTHER PUBLICATIONS

KR100384615_Machine_Translation.pdf (Year: 2001).*

(Continued)

*Primary Examiner* — Dale Moyer
(74) *Attorney, Agent, or Firm* — Peter A. Nieves; Sheehan Phinney Bass & Green PA

(57) ABSTRACT

A computer-based method to facilitate detecting wheel imbalance, a tire pressure problem, or excessive tread wear on tires of a moving vehicle is disclosed. The method includes collecting (e.g., from an accelerometer of a mobile personal computing device) data that represents vibration that results, at least in part, from the vehicle's motion, and determining, with a computer-based processor, whether the moving vehicle has wheel imbalance, a tire pressure problem, and/or excessive tire tread wear based at least in part on the vibration data produced by the accelerometer (and, possibly other data), where the mobile personal computing device and the accelerometer are moving with the vehicle when the data is being collected.

26 Claims, 43 Drawing Sheets

(51) Int. Cl.
*G01H 1/00* (2006.01)
*B60C 11/24* (2006.01)
*G01H 17/00* (2006.01)

(58) Field of Classification Search
USPC .................................................. 701/29.6
See application file for complete search history.

(56) References Cited

U.S. PATENT DOCUMENTS

| | | | | |
|---|---|---|---|---|
| 5,826,207 | A * | 10/1998 | Ohashi | B60C 23/061 701/36 |
| 6,353,384 | B1 * | 3/2002 | Kramer | G01M 1/28 340/438 |
| 6,684,691 | B1 * | 2/2004 | Rosseau | B60C 23/061 340/442 |
| 7,213,451 | B2 * | 5/2007 | Zhu | G01M 17/022 73/146 |
| 8,332,092 | B2 * | 12/2012 | Laermer | B60C 23/064 340/443 |
| 10,102,616 | B2 * | 10/2018 | Miller | G06T 7/0006 |
| 2004/0243351 | A1 * | 12/2004 | Calkins | G01H 1/003 702/185 |
| 2006/0267750 | A1 * | 11/2006 | Lu | B60C 23/061 340/440 |
| 2007/0176759 | A1 * | 8/2007 | Ishii | G01H 3/125 340/425.5 |
| 2007/0299573 | A1 * | 12/2007 | Carlstrom | B60T 8/885 701/31.4 |
| 2008/0216567 | A1 * | 9/2008 | Breed | B60C 11/24 73/146.5 |
| 2008/0312783 | A1 * | 12/2008 | Mansouri | G07C 5/0808 701/31.4 |
| 2009/0066498 | A1 * | 3/2009 | Jongsma | B60C 23/0416 340/447 |
| 2009/0139327 | A1 * | 6/2009 | Dagh | G01M 1/225 73/457 |
| 2011/0012720 | A1 * | 1/2011 | Hirschfeld | G07C 5/0808 340/439 |
| 2011/0126617 | A1 | 6/2011 | Bengoechea Apezteguia et al. | |
| 2012/0053805 | A1 * | 3/2012 | Dantu | B60W 40/09 701/70 |
| 2013/0173136 | A1 * | 7/2013 | Kim | B60Q 1/00 701/101 |
| 2013/0233083 | A1 * | 9/2013 | Hofelsauer | G01H 1/12 73/649 |
| 2014/0058580 | A1 * | 2/2014 | Peine | B60C 23/0488 701/1 |
| 2014/0095420 | A1 | 4/2014 | Chun et al. | |
| 2014/0195184 | A1 * | 7/2014 | Maeda | G01D 18/006 702/85 |
| 2014/0350879 | A1 * | 11/2014 | Takiguchi | G01R 29/12 702/70 |
| 2014/0355384 | A1 * | 12/2014 | Workman | G01H 1/00 367/93 |
| 2015/0051785 | A1 | 2/2015 | Pal et al. | |
| 2015/0096362 | A1 * | 4/2015 | Hammerschmidt | G01M 17/025 73/146 |
| 2015/0276556 | A1 * | 10/2015 | Biegner | G01L 17/005 73/584 |
| 2016/0071336 | A1 * | 3/2016 | Owen | G07C 5/008 701/31.4 |
| 2016/0104328 | A1 * | 4/2016 | Chen | G07C 5/0858 701/31.5 |
| 2016/0167446 | A1 * | 6/2016 | Xu | G06F 16/2291 702/34 |
| 2016/0180610 | A1 * | 6/2016 | Ganguli | G07C 5/0808 701/31.9 |

OTHER PUBLICATIONS

Measure_circular_motion.pdf (Year: 2016).*
Speedometer_for_iPhone.pdf (Year: 2015).*
iPhone_5s_-_Technical_Specifications.pdf (Year: 2016).*
Bridgestone_tire_size_input.pdf (Year: 2015).*
Kinematics_of_angular_motion.pdf (Year: 2014).*
International Search Report for PCT/US17/40296 dated Sep. 11, 2017.
J. Siegel, R. Bhattacharyya, Smartphone-Based Vehicular Tire Pressure and Condition Monitoring, for the SAI Intelligent Systems Conference, Sep. 21-22, 2016, London.

* cited by examiner

FFT based classification
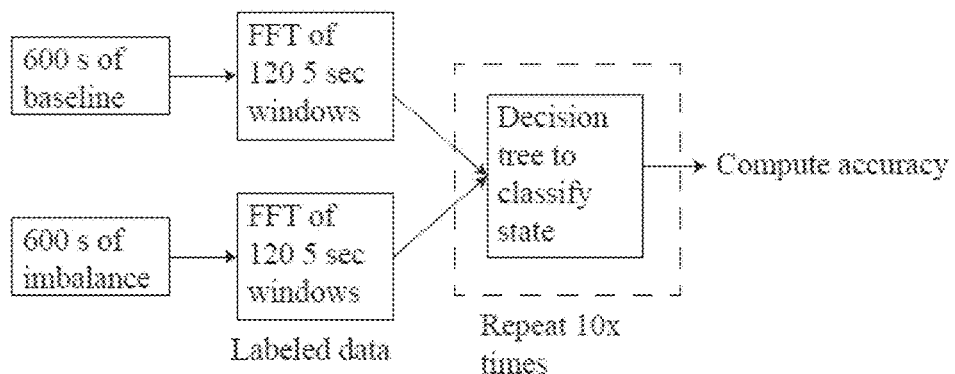
PCA based classification
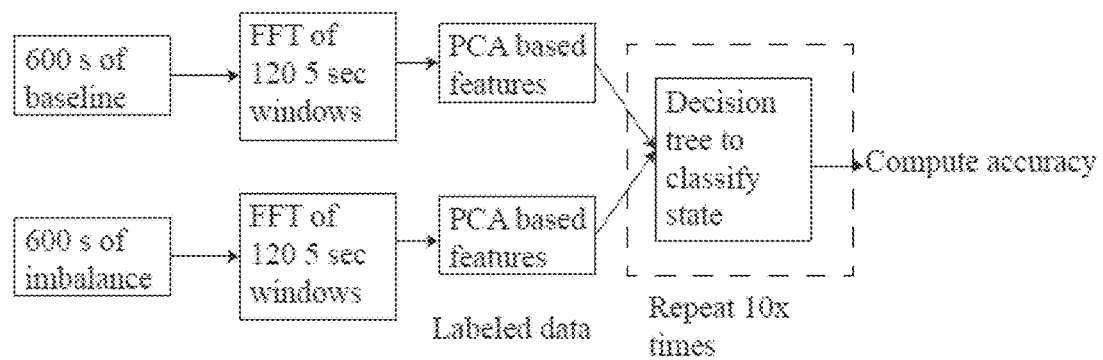
FIG. 6

| FIG.30A |
| FIG.30B |
| FIG.30C |

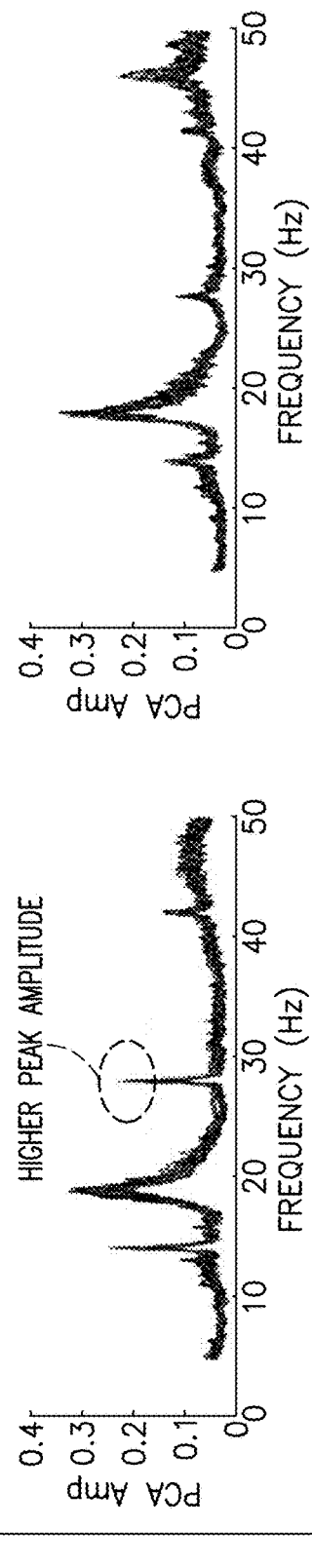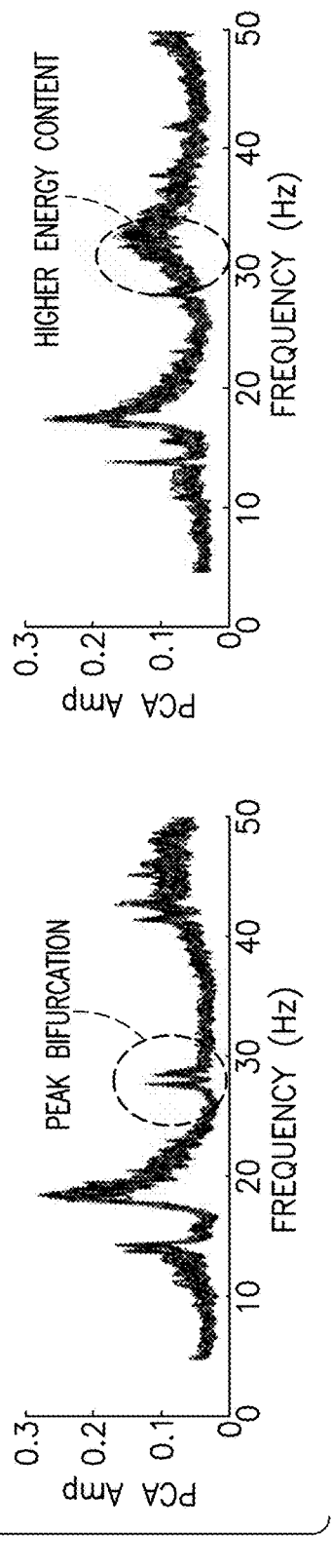
FIG. 30C

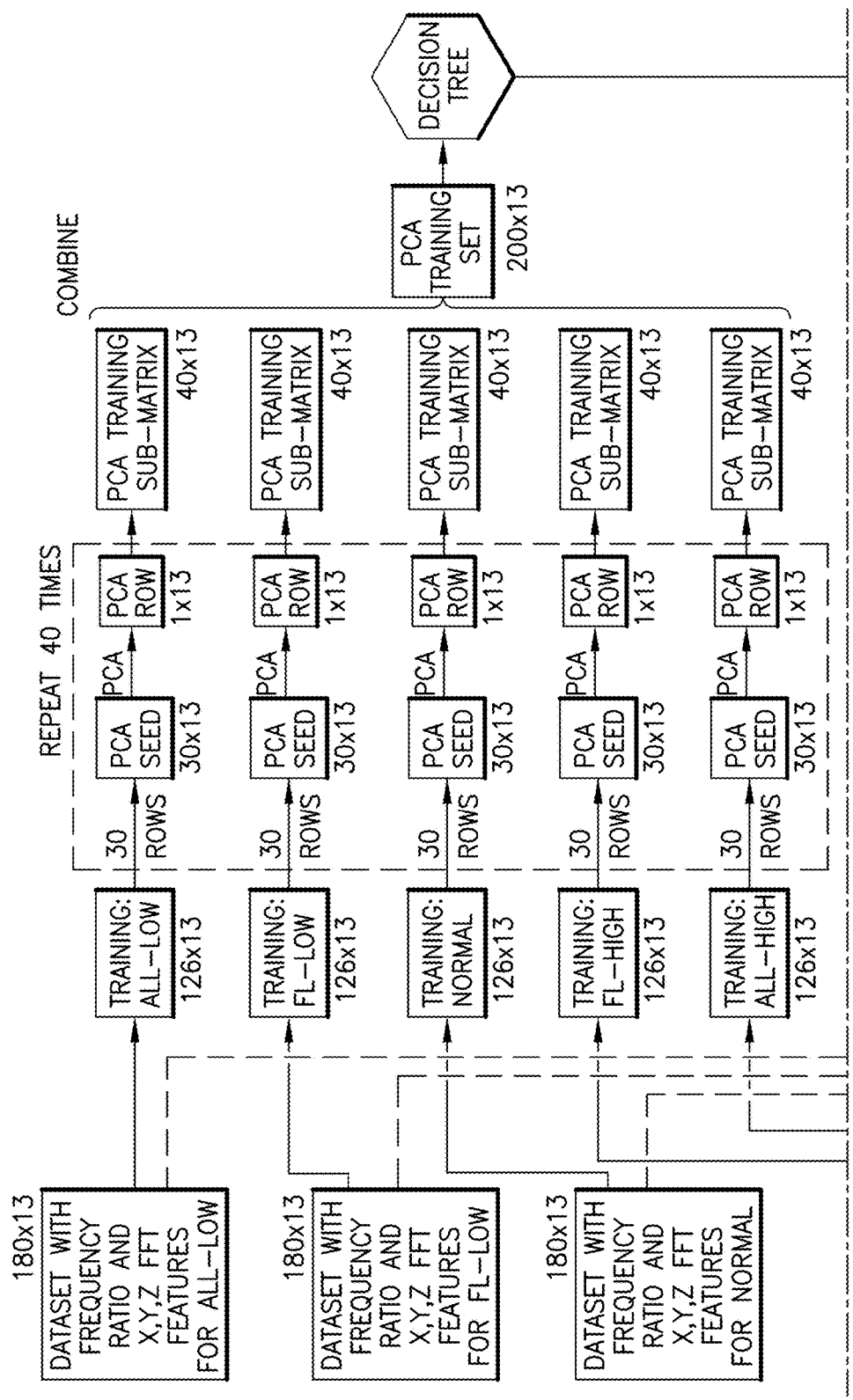

| Prediction / Ground Truth | All Low | FL Low | Normal | FL High | All High |
|---|---|---|---|---|---|
| All Low | 14 | 0 | 0 | 0 | 0 |
| FL Low | 0 | 14 | 0 | 0 | 0 |
| Normal | 0 | 0 | 14 | 0 | 0 |
| FL High | 0 | 0 | 0 | 14 | 0 |
| All High | 1 | 0 | 0 | 0 | 13 |

FIG. 33

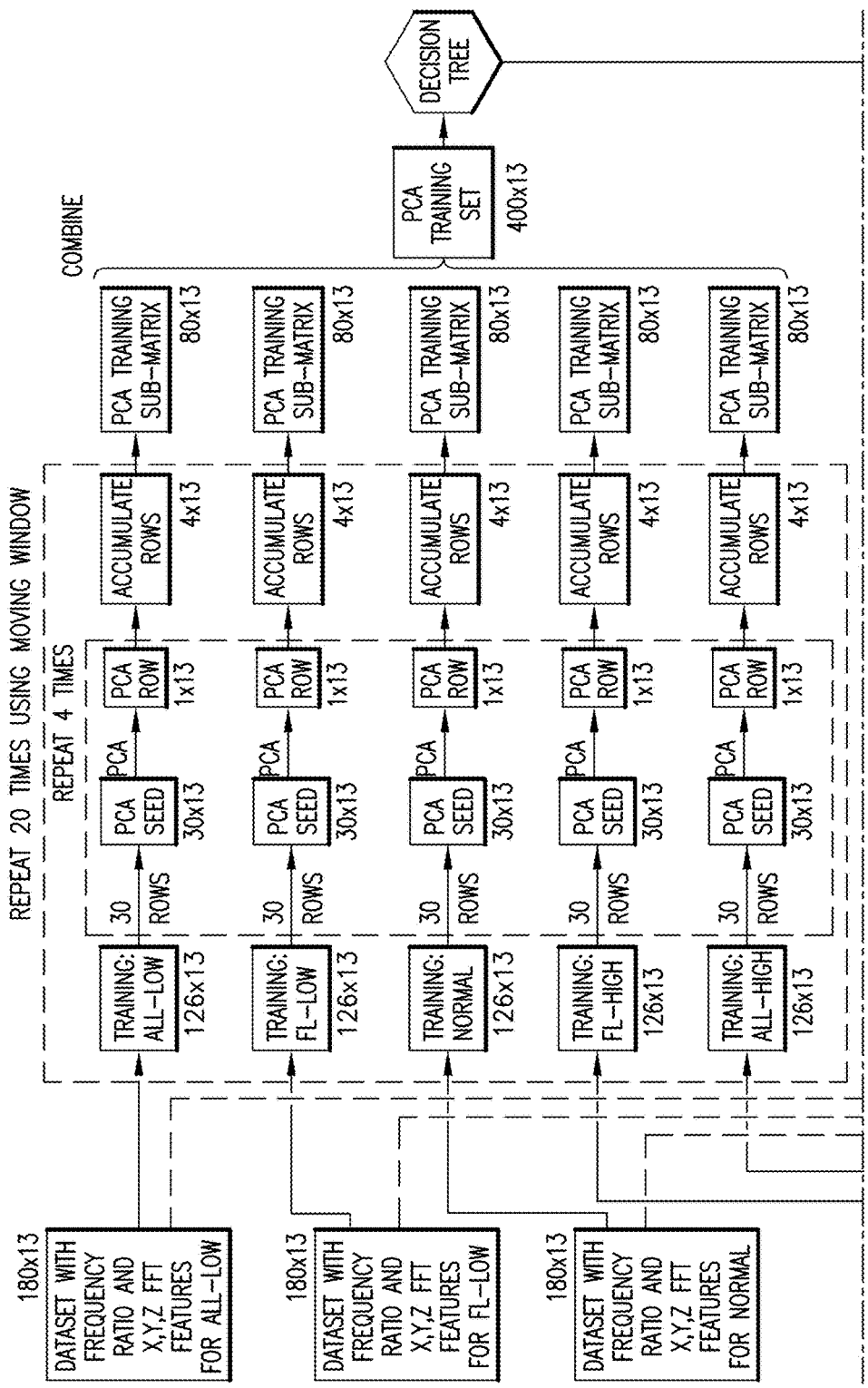

| Ground Truth \ Prediction | All Low | FL Low | Normal | FL High | All High |
|---|---|---|---|---|---|
| All Low | 20 | 0 | 0 | 0 | 0 |
| FL Low | 0 | 16 | 3 | 1 | 0 |
| Normal | 0 | 1 | 19 | 0 | 0 |
| FL High | 0 | 0 | 0 | 20 | 0 |
| All High | 0 | 0 | 0 | 0 | 20 |

FIG. 37

APPLYING MOTION SENSOR DATA TO WHEEL IMBALANCE DETECTION, TIRE PRESSURE MONITORING, AND/OR TREAD DEPTH MEASUREMENT

CROSS-REFERENCE TO RELATED APPLICATION(S)

This application claims priority to U.S. Provisional Patent Application Ser. No. 62/356,673, filed on Jun. 30, 2016 and entitled, System and Method for Applying Motion Sensor Data to Wheel Imbalance Detection, Tire Pressure Monitoring and Tread Depth Measurement. The subject matter of the prior application is being incorporated in its entirety by reference herein.

FIELD OF THE INVENTION

This disclosure relates to systems and techniques to facilitate detecting faults and maintenance needs in a vehicle's suspension system, such as wheel imbalance, tire pressure issues, and/or tread wear problems, early and easily.

BACKGROUND

A vehicle's suspension generally includes its tires, tire air, springs, shock absorbers, linkages, etc. that connects a vehicle to and includes its wheels and allows relative motion between the two.

A variety of problems can arise with a vehicle's suspension. For example, a tire or wheel imbalance relates to the uneven distribution of mass within a vehicle's tire(s) or wheel(s). As another example, tire pressure issues can include over-inflation or under-inflation of one or more (or all) of the tires in a vehicle. Problems can likewise arise if the treads on a tire become too worn.

Early detection of vehicle suspension problems is desirable. However, early detection has not been easy.

SUMMARY OF THE INVENTION

A computer-based method to facilitate detecting wheel imbalance, a tire pressure, tire pressure condition, and/or excessive tread wear on tires of a moving vehicle is disclosed. The method includes collecting (e.g., from an accelerometer of a mobile personal computing device) data that represents vibration that results, at least in part, from the vehicle's motion, and determining, with a computer-based processor, whether the moving vehicle has wheel imbalance, a tire pressure problem, and/or excessive tire tread wear based at least in part on the vibration data produced by the accelerometer (and, possibly other data), where the mobile personal computing device and the accelerometer are moving with the vehicle when the data is being collected.

In yet another aspect, a system is disclosed to facilitate detecting wheel imbalance, a tire pressure problem, or excessive tread wear on tires of a moving vehicle. The system includes a mobile personal computing device (e.g., a smartphone) that has an accelerometer configured such that when the mobile personal computing device is moving with the vehicle, the accelerometer produces data that represents vibration that results, at least in part, from the vehicle's motion. The system also has a computer-based processor and computer-based memory (that can be part of the smartphone or not). The memory stores instructions that, when executed by the computer-based processor (which may be locally hosted, hosted in the cloud, or both), cause the computer-based processor to determine, based at least in part on the vibration data produced by the accelerometer, whether the moving vehicle has a wheel imbalance, a tire pressure problem, and/or excessive tire tread wear.

In some implementations, one or more of the following advantages are present.

The ubiquity and low-cost of mobile personal computing devices, such as smartphones, makes their use as tools in vehicle diagnostics appealing. Application development for smart phones is relatively simple, the devices are small, light, and easy to mount, and power options are abundant. In recent years, MEMS motion sensor resolution and sampling rates have greatly improved in mobile devices, making data capture increasingly easy and useful. Many mobile devices also include additional sensors which could provide additional information.

Rim and tire imbalance and unevenness of wheel geometry are common problems in vehicles, with effects ranging from minor annoyance to the driver due to diminished ride quality to severe impact on vehicle function and reduction in service life of high cost or safety-critical components. A bent wheel, or a wheel out of balance, imparts unintended vibration on suspension components and may manifest as a "shimmy" or "shake" on the steering wheel, rattle a vehicle and its contents, or cause loads to be applied on vehicle components in unanticipated ways. This varied loading can pose a challenge to gaining or maintaining traction due to complex dynamics. Additionally, wheel vibration can cause uneven tire tread wear and the presence of vibration due to imbalance is often an indicator correlated with the development of larger problem, such as a bent tie rod occurring from the same incident, causing the initial imbalanced condition. Large wheel deformations can even lead to slow leaks and air loss, which at best reduce fuel economy and vehicle performance, and at worst, lead to a blowout with potentially dire consequences. It is for these reasons that monitoring wheel and tire balance is critical to the safe operation and proper long term maintenance strategy for any wheeled vehicle, particularly those which are lightweight and operate at high sustained speeds, such as many modern passenger vehicles. Unfortunately these imbalance issues were traditionally only detected and corrected for during vehicle maintenance and inspection checks, set at fixed, infrequent intervals.

In-situ monitoring, as disclosed herein, allows the collection of data about vehicle behavior in real-time and can mitigate driver annoyances, reduce the cost of ownership of a vehicle, and help to ensure safe and comfortable operation of a vehicle across a range of speeds and conditions. Moreover, the in-situ monitoring disclosed herein is simple and easy to use, requiring few behavior changes.

Likewise, poor tire condition (e.g., from under or over inflation or excessive tread wear, etc.) adversely affects vehicle efficiency, braking, steering, acceleration, ride harshness, and fuel consumption. Rolling resistance and effective damping rate depend on tire pressure, with under-inflation reducing fuel economy, decreasing comfort, and increasing the risk of blowout. Excess pressure reduces traction contact patch area and results in a stiff ride and jumpy steering. Improper inflation also has benign effects, such as impacting the speedometer's accuracy.

While most drivers know to set initial pneumatic tire pressures carefully, age, wear, gas diffusion, temperature effects, and punctures may cause unnoticed changes in pressure and accelerate wear if unaddressed. The issue of tire pressure non-compliance is significant, with a US government-run study reporting 12% of cars surveyed in the US (including those with factory-installed pressure monitoring systems) having one or more tires underinflated by at least 25%. Associated costs are significant, with the fuel consumption in under-inflated vehicles increased by 3.3% in up to 36% percent of vehicles. Though monitoring tire pressure is critical to the longevity and safe and comfortable operation of a vehicle, many drivers favor reactive inspection, which occurs too late to avoid the manifestation of pressure related problems. Providing richer information to drivers may reduce the number of vehicles driving outside of specifications, enhancing safety and reducing fuel consumed.

Sufficient tread is similarly important to the safe operation of a vehicle in adverse weather conditions. The grooves found on the contact surfaces of a tire allow vehicles to drive through water and snow, avoid hydroplaning, and provide additional compliance for irregular surfaces. As tread wears down, these benefits diminish until traction and safety are compromised.

Reduced tread depth increases wet stopping distances. When the tread becomes too shallow to compress and release snow in winter, traction is reduced. These differences typically feel small to a driver, but make a big difference in the panic situations where traction is most critical. The relationship between low tread and tire-related vehicle crashes is statistically significant, with studies showing a higher incidence of crashes than average when tread depth was less than half of a typical tire's original depth.

Excessive tread wear is common. The National Highway Traffic Safety Administration found that 50% of cars surveyed had one or more tires worn to or below half of the original tread depth. 10% had a bald tire, with no remaining tread and severely compromised safety. The ability to noninvasively detect this condition and inform drivers proactively has the ability to reduce vehicle collisions, safe lives, and prevent unplanned downtime.

Of course, the cost implications of fixing serious and even not-so-serious implications of imbalance/tire pressure issued can be significant. Moreover, the move to peripheral devices is advantageous since a) a large percentage of drivers use phones for navigation already, b) entire sensor networks can be replaced with non-invasive monitoring c) the peripheral devices approach is modular and easily upgradable. A few statistics are notable in this regard. Approximately $50/year in savings can be realized by having properly inflated and balanced tires/wheels—from fuel savings and reduced wear. At least about 61% of drivers trust mobile phones to provide recommendations for repair. At least about 60% of drivers keep phone mounted to windshield regularly (so no behavioral changes required). With this technology, certain in-vehicle sensors and computing payload can be eliminated, reducing wiring cost and weight. Moreover, the technology can be updated in-field without having to return for dealership service.

Additionally, in some implementations, the system and/or techniques disclosed herein may provide near-real time condition monitoring of a vehicle's condition, including, for example, the condition of the vehicle's wheels and tires. The phrase near-real time means without any deliberate delay introduced by the system.

Other features and advantages will be apparent from the description and drawings, and from the claims.

BRIEF DESCRIPTION OF THE DRAWINGS

FIG. 6 is schematic representation of supervised machine learning techniques applied in a study discussed herein; the top schematic representation relates to an FFT-based classification scheme, and the bottom schematic representation relates to a classification scheme that uses PCA transformation of the FT features.

FIGS. 30A-30C include charts showing PCA transformed features.

FIGS. 32A-32B are a schematic representation of an exemplary process for analyzing sensor data sets.

FIG. 33 is a confusion matrix (random sample).

FIGS. 36A-36B are a schematic representation of an exemplary process for analyzing sensor data sets.

FIG. 37 is a confusion matrix showing classifier performance for different tire pressure states (sliding window).

Like reference characters refer to like elements.

DETAILED DESCRIPTION

This disclosure relates to systems and techniques to facilitate detecting faults in a vehicle's suspension, such as wheel imbalance, tire pressure issues, and/or tread wear problems, early and easily. More particularly, this disclosure relates to using one or more sensors or sensing functionalities (e.g., an accelerometer, a geolocation module, a speed sensor, and/or a gyroscope) that may be associated with a mobile personal computing device (e.g., a smartphone) to collect data about the vehicle's motion, and processing that data, (e.g., in real-time while the vehicle is being driven around in its ordinary course of use) to facilitate detecting any wheel imbalances, tire pressure issues, and/or excessive tread wear, early and easily. In a typical implementation, if the system identifies the presence of any of these undesirable characteristics, then the system can inform the vehicle owner and/or the driver with an electronic communication (e.g., a text, a push notification, an email, or audio communication) that may be accessible at the mobile personal computing device (or at another device or service).

The monitoring in this regard can be automatic and essentially continuous, meaning that any time the smartphone is in, on or with the vehicle and the vehicle is in motion, the smart phone can be collecting and processing data and, if a problem arises—even so slightly—the vehicle owner or driver can be informed immediately. It has been discovered that the systems and techniques disclosed herein can effectively identify developing problems (e.g., wheel imbalances, tire under-inflation or over-inflation, and/or excessive tread wear) far sooner than a person driving the vehicle will be able to notice that anything might be amiss.

In a typical implementation, many of the techniques disclosed herein (e.g., the data collection and processing) are executed by the mobile personal computing device largely in the background. Therefore, in a typical implementation, once the system is set up and running on the mobile personal computing device, unless and until a problem is identified, the user can rest easy knowing that the monitoring is occurring, but the system won't necessarily present any other information to the user or otherwise require any attention or interaction by the user.

Therefore, in a typical implementation, the systems and techniques disclosed herein can provide for early detection of faults in the vehicle suspension with very little burden to the vehicle owner or driver.

Figure 1:
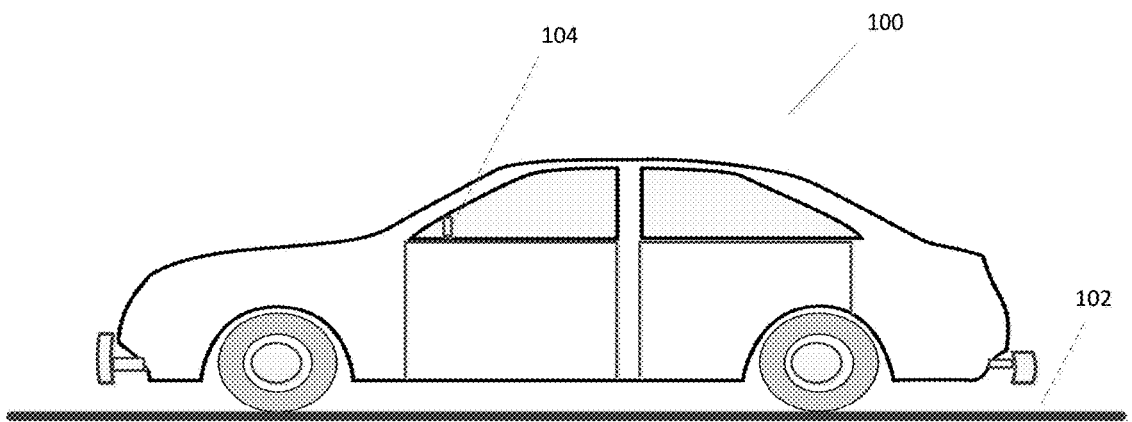
FIG. 1 is a side view of an exemplary implementation of a vehicle driving along a road with a mobile personal computing device (e.g., smartphone) inside the cab of the vehicle mounted to the vehicle's dashboard.

FIG. 1 is a side view of an exemplary implementation of a vehicle 100 driving along a road 102 with a mobile personal computing device 104 inside the cab of the vehicle 100 mounted to the vehicle's dashboard. This is one exemplary way that the mobile personal computing device 104 can be configured relative to the vehicle 100 to enable the system, which includes the mobile personal computing device 104, to perform and/or facilitate the functionalities disclosed herein.

In a typical implementation, the mobile personal computing device 104 is configured so that, while the vehicle is being driven (by a person not shown in FIG. 1), one or more sensors (e.g., an accelerometer, a geolocation module, and/or a gyroscope) inside the mobile personal computing device are collecting data about the vehicle's motion (e.g., vibration data, location data, turning data, etc.). The collected data is processed (either locally at the mobile personal computing device 104, remotely, or with a combination of local and remote processing, e.g., in the cloud) to facilitate the detection of wheel imbalances, tire pressure issues, and/or excessive tread wear in the tires. In a typical implementation, the processing may include a determination as to whether any such undesirable characteristic exists and, if so, inform the vehicle owner and/or driver with an electronic communication (e.g., a text, a push notification, an email, or audio communication) that can be accessed, for example, at the mobile personal computing device 104. In various implementations, part (or all) of the processing happens in real-time, for example, while the vehicle is being driven around in its ordinary course of use.

Figure 2:
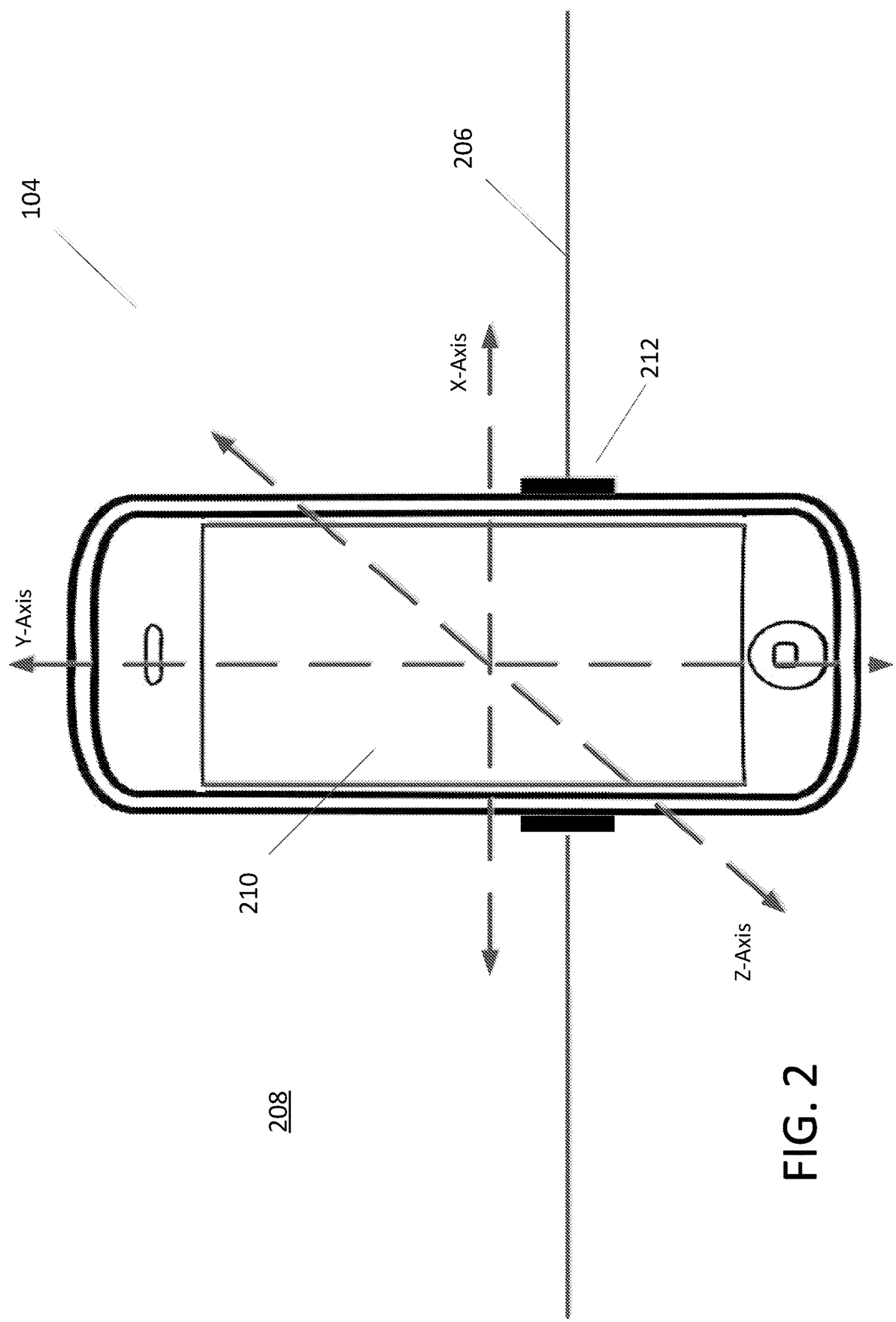
FIG. 2 is a front close-up view of the mobile personal computing device of FIG. 1 with schematic labeling of three separate axes (x, y and z).

FIG. 2 is a front close-up view of the mobile personal computing device 104, which, in the illustrated implementation, is a smartphone, with schematic labeling of three separate axes (x, y and z) of the mobile personal computing device 104. The vehicle's dashboard 206 and transparent windshield 208 are shown behind the smartphone 104.

In the illustrated implementation, the x-axis is substantially parallel to the flat front surface of the screen 210 of the smartphone 104 and extends across the screen 210 in the shortest direction. The y-axis is perpendicular to the x-axis, is substantially parallel to the flat front surface of the screen 210 of the smartphone 104, and extends across the screen 210 in the longer direction. The z-axis is perpendicular to the x-axis and the y-axis. The smartphone 104, in the illustrated implementation, is coupled to the dashboard via a support 212 and arranged so that its x-axis and z-axis are substantially horizontal, its y-axis is substantially vertical, and its screen 210 is viewable by a person sitting in the driver's seat or a passenger seat inside the vehicle.

In other embodiments (less preferable) the phone could be, for example, located within a cup-holder. In such cases, coordinate normalization may be required. Techniques to accomplish such normalization would be understood to those skilled in the field.

Figure 3:
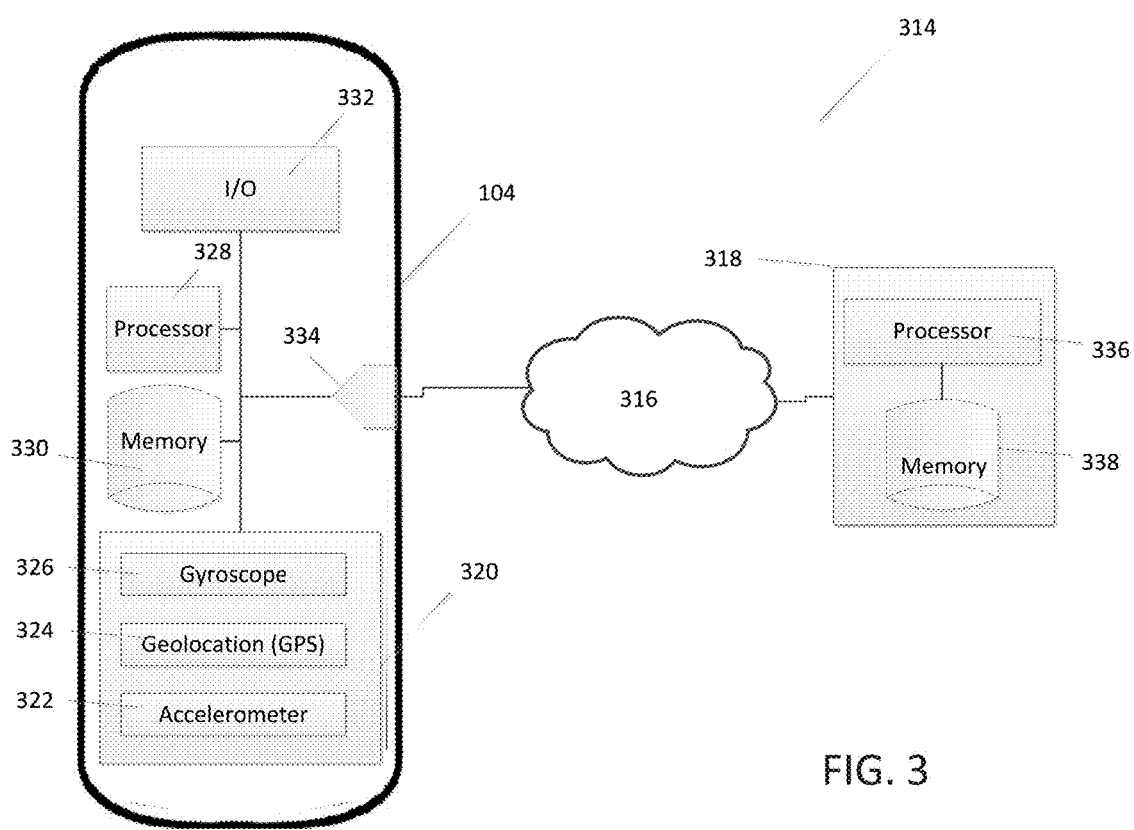
FIG. 3 is a schematic diagram of an exemplary implementation of a system to facilitate detecting, and (optionally) alerting a user to, faults in a vehicle's suspension, such as wheel imbalance, tire pressure issues, and/or tread wear problems.

FIG. 3 is a schematic diagram showing an exemplary implementation of a system 314 to facilitate detecting, and (optionally) alerting a user to, faults in a vehicle's suspension, such as wheel imbalance, tire pressure issues, and/or tread wear problems.

The illustrated system 314 includes the smartphone 104, a communications network 316 (e.g., the Internet), and a remote data processing system 318.

The smartphone 104 has sensors 320, which, in the illustrated implementation, include an accelerometer 322, a geolocation module 324, and a gyroscope 326, a processor 328, memory 330, one or more input/output components 332, and a wireless transceiver 334.

An accelerometer is a device configured to measure acceleration. In the illustrated smartphone, the accelerometer 322 is configured to measure acceleration along three axes (e.g., the x-axis, the y-axis and the z-axis) of the smartphone 104.

The geolocation module 324 is a device configured to determine a location of the smartphone. In some implementations, the geolocation module may include a global positioning system (GPS) receiver. The Global Positioning System (GPS) is s a global navigation satellite system that provides geolocation (and time) information to a GPS receiver virtually anywhere on or near the Earth.

A gyroscope is a device for measuring or sensing orientation, based, for example, on principles relating to angular momentum. In some embodiments, the gyroscope 326 may provide information about movement by the smartphone across the respective axes (x, y and z) based, for example, on inertial sensing. This sort of information may indicate or be used to determine if the vehicle (where the mobile personal computing device is located) is turning or not. As disclosed herein, gyroscope functionalities can be leveraged to determine, for example, when the vehicle is traveling in a relatively straight line or not (e.g., if it is turning).

The processor 328 can be virtually any kind of computer-based processor(s) that is/are able to perform or facilitate functionalities disclosed herein. The memory 330 can be virtually any kind of computer-based memory storage device(s) that are able to store computer-readable data, including computer-readable instructions, to support the various functionalities disclosed herein. In a typical implementation, the processor 328 performs functionalities in accordance with the computer-readable data and instructions in the memory 338.

The input/output components 332 can include any one or more of a variety of components that can deliver output to and/or receive input from a user. Some examples include a display (e.g., a graphical user interface with touch capability), audio speaker, microphone, communication module to signal another device, etc.

The transceiver 334 can be virtually any kind of a device that is able to transmit and/or receive data over a wireless network, such as the Internet 316.

The remote data processing system 318 has a processor 336 and memory 338. The processor 336 can be virtually any kind of computer-based processor(s) that is/are able to perform or facilitate functionalities disclosed herein. The memory 338 can be virtually any kind of computer-based memory storage device(s) that are able to store computer-readable data, including computer-readable instructions, to support the various functionalities disclosed herein. In a typical implementation, the processor 336 performs functionalities in accordance with the computer-readable data and instructions in the memory 338.

The processing disclosed herein may be performed by the processor 328 of the mobile personal computing device 104, by the processor 336 of the remote processing system 318, or by a combination of both. In implementations that involve the remote processing system 318, the transceiver 334 of the mobile personal computing device 104 (e.g., in conjunction with a corresponding device/module at the remote processing system 318) facilitates communications between the mobile personal computing device 104 and the remote processing system 318.

Figure 4:
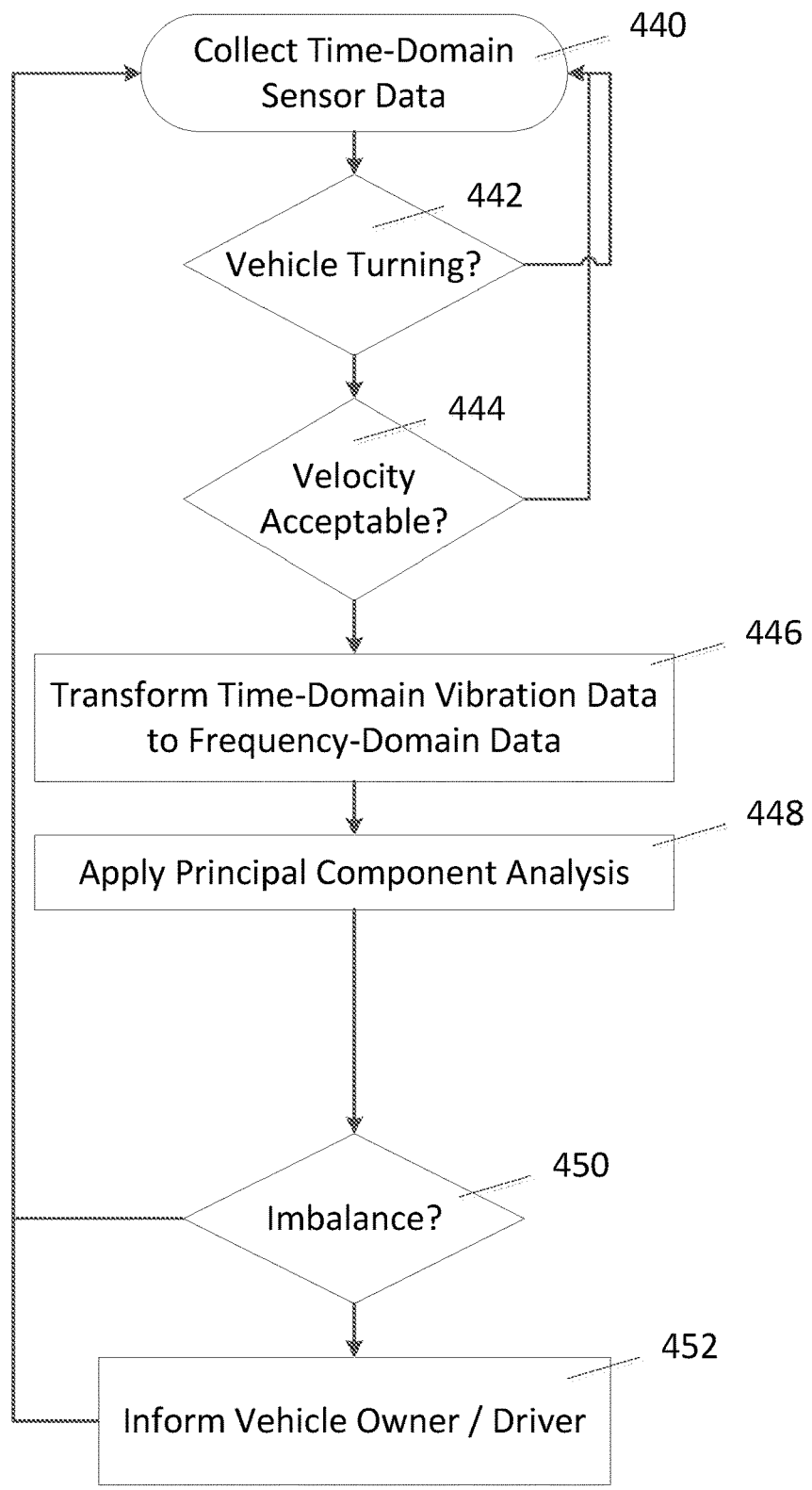
FIG. 4 is a flowchart of an exemplary process to facilitate detecting faults (i.e., wheel or tire imbalances) in a vehicle's suspension.

FIG. 4 is a flowchart of an exemplary process to facilitate detecting faults in a vehicle's suspension.

More particularly, the illustrated implementation is directed to a technique for facilitating detection of wheel imbalances that may be caused, for example, by wear or impact. In a typical implementation, one or more (or all) of the steps represented in the illustrated flowchart would be performed (or facilitated) by the system 314 while the mobile personal computing device 104 is in, on, or in contact with the vehicle 100 and while the vehicle 100 is being driven.

More particularly, in various implementations, the steps of the represented process may be performed by the mobile personal computing device 104 alone or in combination with the remote processing system 318. Any references to processors, memory, or the like, in the following description should be understood as referring to the processor and memory in either one or both of the mobile personal computing device 104 or the remote processing system 318.

The process represented in the flowchart includes collecting (at 402) time-domain data from one or more of the sensors in the mobile personal computing device 104. In some implementations, this would include collecting a sequence of time-domain vibration data with the accelerometer 322 in the mobile personal computing device 104, collecting a sequence of time-domain position data with the geolocation module 324 in the mobile personal computing device 104, and/or collecting a sequence of time-domain orientation data with the gyroscope 326 in the mobile personal computing device 104. In various implementations, other types of time-domain data may be collected by other types of sensors as well.

The time-domain vibration, position and orientation data collected by the sensors is related to and representative of the vehicle's motion (i.e., vibration, position, and orientation including whether it is turning or not, etc.).

Although shown as a discrete step in the illustrated process, in a typical implementation, the time-domain data is collected in a relatively ongoing and continuous manner from the various sensors.

Next, according to the represented process, the system 314 (at 442 and 444) engages in a form of data windowing/filtering. In signal processing data windowing refers generally to excluding data from a process if that data falls outside of some specified range of characteristic values.

In the illustrated implementation, for example, data is excluded (i.e., not used to assess wheel imbalance) if it is determined that vehicle 100 was turning when the data was being collected. The reason for excluding data if it was collected while the vehicle 100 was turning is because when a vehicle is turning, its outer wheels turn faster than its inner wheels. This phenomenon can introduce vibrations that are only present when the vehicle is turning and that do not necessarily relate to any wheel imbalance that the vehicle may be experiencing.

In a typical implementation, and as shown in the illustrated flowchart, a processor (e.g., 328 and/or 336) in the system 314 makes a determination (at 442) whether the data was collected while the vehicle 100 was turning or not. The data that is considered in determining whether the vehicle was turning or not may come from the gyroscope 326, for example. The phone gyroscope is capable of determining that the vehicle is turning by examining the vehicle's angular rate over time, for example by integrating this angular rate as part of an inertial measurement process.

If the processor determines (at 442) that the vehicle was turning when the data was being collected, then that data is excluded (i.e., not used to assess wheel imbalance). If, on the other hand, the processor determines (at 442) that the vehicle was not turning (e.g., not turning enough to cause any discernable issues), then the data is not immediately excluded and the process continues to step 444.

In some implementations, in its turning analysis, the system 314 may consider an angular rate threshold (e.g., 20 deg/sec [at 60 MPH, a vehicle would move slightly over two lane widths to exceed this limit, suggesting turning rather than lane switching]). If this were the case the inside wheels and outside wheels typically would be near identical in rotational frequency.

To be clear, while the system being discussed herein can filter for turning when performing imbalance classification, turn filtering may not be totally necessary. However, turn-filtering is significantly more useful when conducting tire pressure and tread depth measurement due to the reduced signal-to-noise ratio.

In step 444, data is excluded (i.e., not used to assess wheel imbalance) if the vehicle was driving too slowly (e.g., below 35 miles per hour or below 45 miles per hour) when the data was being collected. Data is excluded if it was collected while the vehicle was driving too slowly because such reliance upon such data tends to be less reliable in trying to assess wheel imbalance. The anomaly's signal strength drops relative to the system and measurement device's noise. The data that is considered in determining the speed of the vehicle at a particular point in time may be derived, for example, from distance and time information from the geolocation module 324 (or from the vehicle's speedometer via a wireless diagnostic interface.

In some implementation, other forms of data windowing/filtering may occur as well.

According to the illustrated implementation, after the data windowing/filtering of steps 442 and 444, a processor of the system 314 (at 446) transforms the collected time-domain vibration data to the frequency domain. In this regard, the processor may perform a fast Fourier transform (FFT) (or other implementation of a Fourier transform) on the windowed/filtered vibration data. In general, FFT is an algorithm for computing the Fourier transform of a set of discrete data values (e.g., a time sequence of vibration data values). Given a finite set of data points, for example a periodic sampling taken from the real-world signal, the FFT expresses the data in terms of its component frequencies. Fourier transform may be considered a technique for expressing a waveform, or other sequential data set, as a weighted sum of sines and cosines. The transformation produces a frequency-domain representation of the collected and windowed/filtered vibration data.

Next, according to the illustrated implementation, a processor of the system 314 (at 448) applies principal component analysis (PCA) to the frequency-domain representation of the collected and windowed/filtered vibration data. In general, PCA is a statistical procedure that uses an orthogonal transformation to convert a set of observations (e.g., the frequency domain vibration data) into a set of values of linearly variables called principal components (or sometimes, principal modes of variation). The number of principal components is generally less than or equal to the number of original variables. This transformation can be defined in such a way that the first principal component has the largest possible variance (that is, accounts for as much of the variability in the data as possible), and each succeeding component in turn has the highest variance possible under the constraint that it is orthogonal to the preceding components. The resulting vectors are an uncorrelated orthogonal basis set. Typically, transforming the frequency domain data in principle component space allows for separation of the frequency domain data according to variation. The PCA produces a PCA data set.

According to the illustrated implementation, the system 314 (at 450) analyzes at least a portion of the PCA data set to determine whether any wheel imbalances are represented in the PCA data set. In a typical implementation, the analysis is conducted by applying the PCA data set to a decision tree algorithm implemented by one or more of the processors in the system 314. A decision tree algorithm is an algorithm that applies data to a flowchart-like structure in which each internal node represents a test on an attribute, each branch represents the outcome of the test, and each leaf (or end) node represents a class label (decision taken after computing all attributes). In this particular example and decision tree algorithm application, there may be two possible class labels: 1) a first class label indicating that wheel imbalance is not apparent from the PCA data set, and 2) a second class label indicating that a wheel imbalance is apparent from the PCA data set.

If the system 314 determines (at 450) that a wheel imbalance exists (i.e., that a wheel imbalance is apparent from the PCA data set), then the system 314 (at 452) informs the vehicle owner or driver that the wheel imbalance exists. There are a number of possible ways that the system 314 may inform the vehicle owner or driver that the wheel imbalance exists. For example, in some implementations, the system 314 sends a message (e.g., a push notification, a text message, an email, an audio message, etc.) to the vehicle owner or driver that is accessible from a smartphone (e.g., smartphone 104) or other electronic device.

A system was produced to test some of the concepts disclosed herein. The system was similar to the system 314 disclosed herein. The section that follows presents a description of this system and a description of the testing. It is believed that this section should elucidate some of the concepts disclosed herein.

For the testing, a phone was mounted in a car. The mounting location of the phone was in a rigid mount affixed to the windshield of the car in the vertical position (like, e.g., FIG. 2), as test data in the cup-holder, door panel pocket, and on the arm rest underwent unpredictable rotation and faced additional vibration, picking up noise that would require additional filtering to eliminate. Keeping the phone in a fixed location and orientation prevented the need for tracking the motion of the phone itself (relative to the car), simplifying the analysis of accelerometer signal data and ensuring a higher signal to noise ratio for input data to the classifier (i.e., decision tree).

An experiment was constructed using a 2015 Subaru Impreza with P195/65R15 tires and later repeated with a 2013 Nissan Versa with 15 inch steel wheels and high profile P185/65R15 tires. The high profile sidewall of the tire and small diameter of the wheel minimized the risk of pothole or curb damage due to its action as a compliant region, absorbing impact energy that would otherwise be transferred to the wheel. This helped to ensure a clean set of baseline data with minimal preexisting balance defects. An iPhone 5S sampling at 100 Hz was mounted to the windshield, capturing 3-axis accelerometer data. By the Nyquist-Shannon criterion, this would allow us to detect features of up to 50 Hz without encountering aliasing issues. Generally speaking, in the field of digital signal processing the Nyquist-Shannon sampling theorem is a fundamental bridge between a continuous-time signal (e.g., vibration of a car) and discrete-time signals (e.g., signal samples representing the vibration at discrete times). It establishes a sufficient condition for a sample rate that permits a discrete sequence of samples to capture all the information from a continuous-time signal of finite bandwidth. For the purposes of this particular study focus was on the y-axis component of acceleration (see again FIG. 2), as this is the axis that tends to be most impacted by wheel imbalance.

In each test, the vehicle was first driven at a controlled speed of 60 mph using the car's cruise control feature. Sampled data were available captured for at least 10 minutes in aggregate, with accelerometer and gyroscope data captured to the smartphone mounted to the windshield. This set of data will be referred to as the "baseline" case in the subsequent analysis. 60 mph was chosen as being a significant speed capable of exciting a perceptible imbalance, but not significantly over the cutoff frequency of 50 Hz (for some vehicle configurations, this velocity may be 58 mph, for example). Next, four ¼ oz. adhesive-backed weights were applied to the inside edge of the front right and rear left and right wheels, for a total of 28 g per wheel. The addition of these weights served to induce a moderate level of wheel imbalance, perceptible but not only when attention was drawn to it (in a study conducted by Ford, for example, 60 g weights were referred to as imperceptible by two of three test drivers, indicating the subtlety of the imbalance). This ensured that any classification would be at or below the level of human sensitivity, and as such could produce a situation akin to early indicators of a problem prior to the driver becoming aware of an issue. The data set collected under these circumstances is referred to herein as the "imbalanced" case in the subsequent analysis. Data collection was repeated for an uncontrolled situation (i.e., with driver throttle modulation) to analyze the impact of vehicle velocity constancy, throttle control, and traffic to gauge the efficacy of any devised algorithms in more realistic, real-world scenarios. In the following section, an analysis of the collected accelerometer data is presented.

The analysis of the accelerometer data proceeds in three phases. First, signal processing techniques (e.g., frequency band-pass techniques to remove low and high frequency events from the signal) were applied in a data-preprocessing step to reduce obvious sources of noise in the data. More particularly, anything between 0-5 Hz was discounted as 1/f noise. Next, a spectral analysis of the data was conducted. Finally, machine learning techniques to detect wheel imbalance conditions were developed. The following sections discuss each phase.

The data pre-processing included mitigating the contaminating effects of low-frequency dynamics such as pothole striking events, road surface imperfections and infrastructure contributions such as expansion joint periodicity. This was achieved by passing the collected accelerometer data through a high-pass filter. The value of the cutoff frequency for this filter was obtained by considering both the low-frequency dynamics as well as typical wheel and tire sizes and common highway speeds. In this regard, it was assumed that events such as pothole impacts and road imperfections would be due to aperiodic one-off events, which have an impulse of energy diffused across the frequency spectrum. Expansion joints spaced at 5 m appeared at a periodic 5.36 Hz for a vehicle speed of 60 mph, while acceleration and deceleration events under control of the throttle tend to be modulated at low frequencies. In the case of this study, at 60 mph (26.8 m/s), and assuming a tire circumference of 1993.34 mm (for the P195/65R15 tire size of the Subaru Impreza), a tire rotational frequency of 13.4 Hz (13.6 for the Nissan Versa's smaller tire) was anticipated. The cutoff frequency for the filter, therefore, was set at 5 Hz, to minimize environmental measurement. This may vary, for example, between 3 and 8 Hz, which may allow for varied tire sizes and reduced vehicle speeds to about ~35 MPH.

Next, spectral analysis was applied to the collected accelerometer (e.g., vibration) data. Recall that 10 minutes of accelerometer data was obtained for both the baseline and imbalanced cases. This data was segmented into 120 sub-sets each containing 5 seconds worth of data. Then, FFT was applied to obtain a spectral representation of each sub-set.

Figure 5:
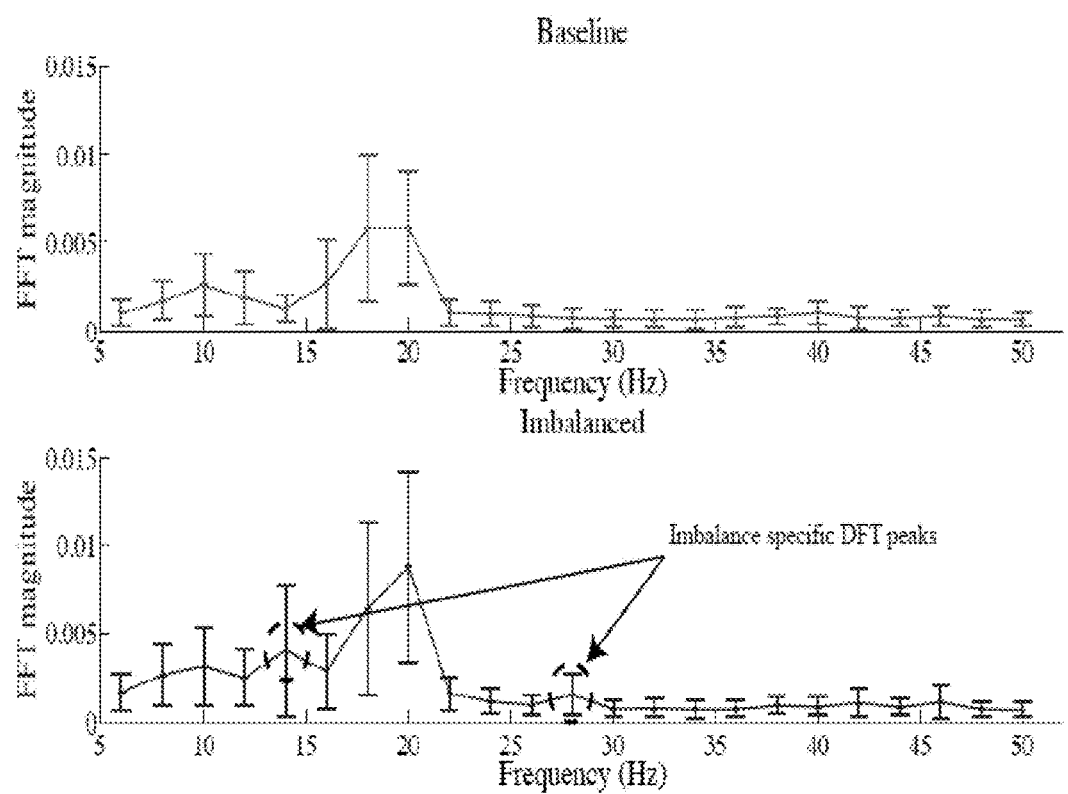
FIG. 5 includes two charts plotting FFT magnitude vs. frequency for baseline data (top chart) and imbalance data (bottom chart).

FIG. 5 presents statistics from the spectral analysis of the 120 sub-sets for both the baseline and imbalanced case. In the illustrated figure, each sub-set contains about 500 data points (for a sampling rate of 100 Hz), discrete Fourier transform (DFT) magnitudes are computed in 2 Hz buckets from 6-50 Hz. And the mean and standard errors are plotted across the 120 subsets of data.

Significant energy contributions can be noted at the following frequencies:
Common peaks: We note a peak in the Fourier Transform plots at about 10 Hz and another at 18-20 Hz. These occur in both the baseline and imbalanced cases. The sources of these energy components are discussed in more detail below.
Imbalance specific peaks: There also appears to be a visible peak at 14 and 28 Hz for the imbalanced case which are statistically significant under the Student's t-test (see Table 1).

TABLE 1

Student t-statistics for peak frequencies observed in the imbalanced condition

| Frequency (Hz) | t-stat | Result ($\alpha = 0.05$) |
| --- | --- | --- |
| 14 | 7.8810 (d.o.f 118) | Significant peak |
| 28 | 6.9773 (d.o.f 118) | Significant peak |

In probability and statistics, a student's t-distribution (or t-statistics) may refer to any member of a family of continuous probability distributions that arises when estimating the mean of a normally distributed population in situations where the sample size is relatively small and population standard deviation is unknown.

It is also worth noting the variability between sub-sets of data as illustrated by the spread in the average data. The use of supervised machine learning techniques, and specifically a decision tree algorithm, was explored to quantify the success of imbalance detection.

FIG. 6 presents a high level overview of the supervised machine learning techniques applied in the study.

According to the represented techniques, for FFT based classification, 600 seconds of baseline data and 600 seconds of imbalance data were collected. FFT was applied to 120 5 second windows of baseline data and FFT was applied to 120 5 second windows of imbalance data, labeled. The resulting data was applied to a decision tree to classify state. Some portion (e.g., 80%) of the resulting data was used to train the decision tree, and some portion (e.g., 20%) of the resulting data was used for testing. This was repeated 10 times. The illustrated process produced a computed accuracy.

According to the represented techniques, for PCA based classification, 600 seconds of baseline data and 600 seconds of imbalance data were collected. FFT was applied to 120 5 second windows of baseline data and FFT was applied to 120 5 second windows of imbalance data. A PCA transform was applied to the baseline and imbalance FT data. The resulting data was applied to a decision tree to classify state. Some portion (e.g., 80%) of the resulting data was used to train the decision tree, and some portion (e.g., 20%) of the resulting data was used for testing. This was repeated 10 times. The illustrated process produced a computed accuracy.

Referring again to the common peaks referred to above, the frequency peaks observed at 10 and 18-20 Hz may be attributed to any one or more of several possible factors—e.g., engine vibration dynamics, transmission rotating components or windshield and phone mount resonance. These excitation frequencies were investigated in more detail to make sure that they were not attributed to wheel motion or balance issues.

Figure 7:
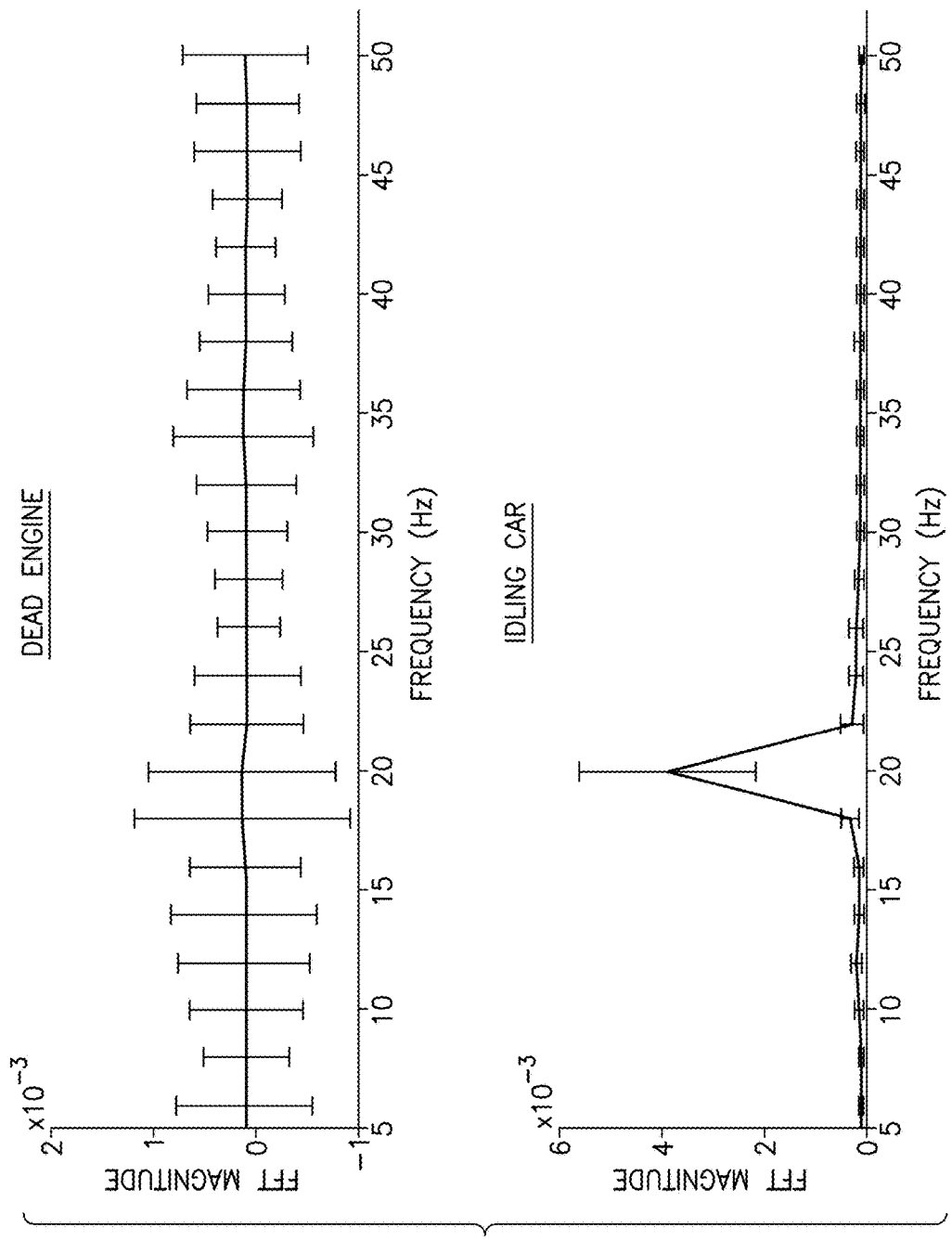
FIG. 7 includes two charts plotting FFT magnitude vs. frequency for a vehicle with a dead (or off) engine (top chart) and a vehicle with an idling engine (bottom chart).

In this regard, first, the car was allowed to idle and data was recorded with the vehicle engine on and the phone in the mount, and the data were recorded in the same vehicle and mount configuration with the engine off. The peak at 20 Hz still appeared with the engine on, indicating that this excitation frequency was attributed to engine operations and its manifestation in windshield and phone mount vibrations. The comparison of engine on and engine off is shown in FIG. 7. More specifically, FIG. 7 is a plot showing a comparison of the Fourier transform results for a vehicle with the engine off and the phone mounted, and idling with the engine on and the phone mounted.

Second, an attempt was made to attribute the 10 Hz excitation frequency with the vehicle's mechanics. Few components in a vehicle rotate. The engine and wheels could be eliminated based on their difference in measured frequency. The transmission, however, rotates when the vehicle is in motion and contains several rotating elements operating at different speeds. An experiment was conducted to determine the relationship between transmission engagement and the 10 Hz signal. Data was collected for the vehicle with the engine on and in park, and with the engine on and in gear with the parking brake applied. In park, a pawl keeps the transmission from rotating. In drive, the rotating elements are free to move and a torque converter regulates engagement of the various rotating elements.

Figure 8:
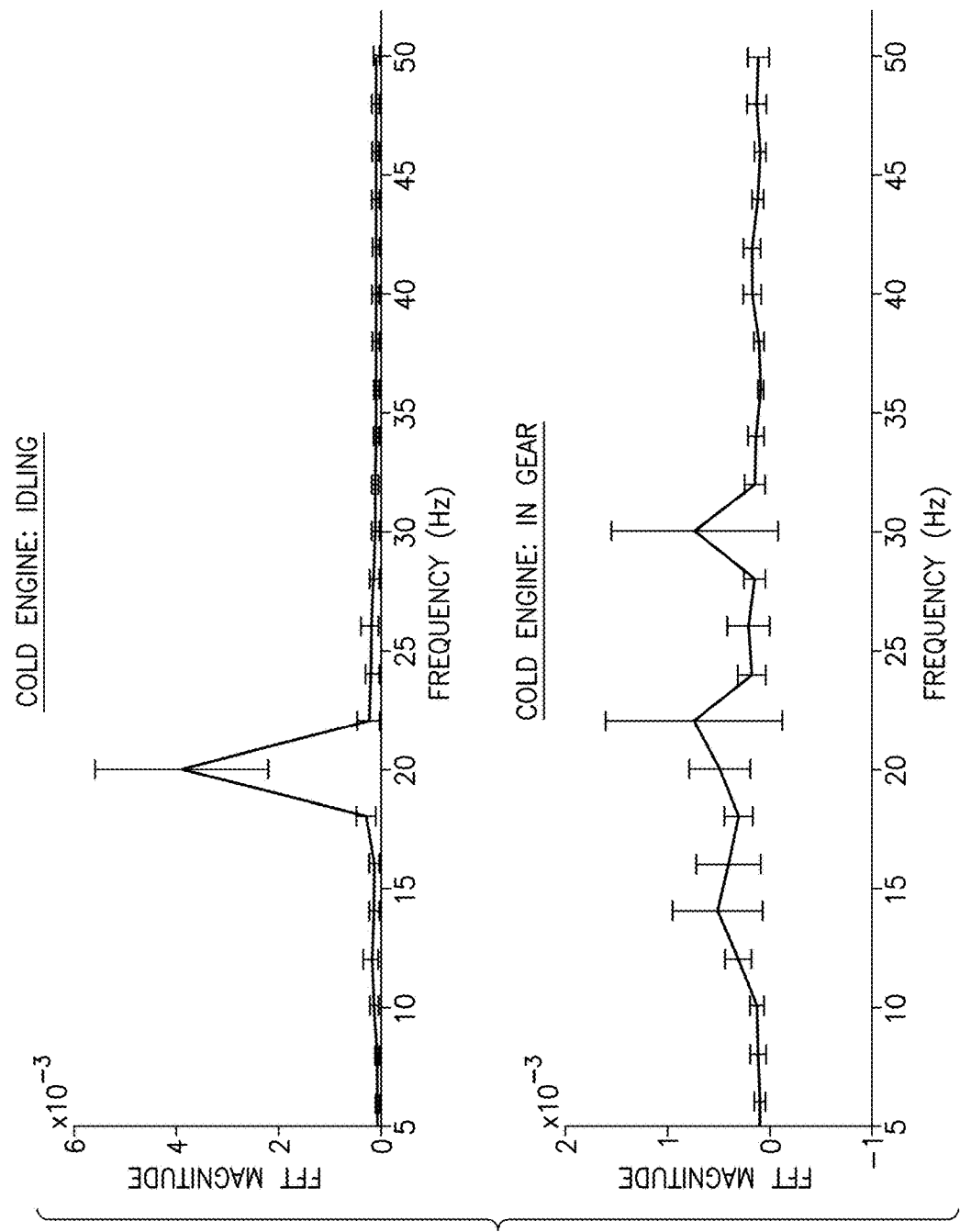
FIG. 8 includes two charts plotting FFT magnitude vs. frequency for a vehicle with a cold engine idling (top chart) and a vehicle with a cold engine in gear (bottom chart).

With a cold engine operating at fast idle to warm up, the Fourier Transform plot shows a 10 Hz peak when in gear but not when idling in park (see, e.g., FIG. 8). FIG. 8 is a plot showing a comparison of the Fourier transform results for a vehicle with an engine warming up from the cold state when in gear and when idling in park.

Figure 9:
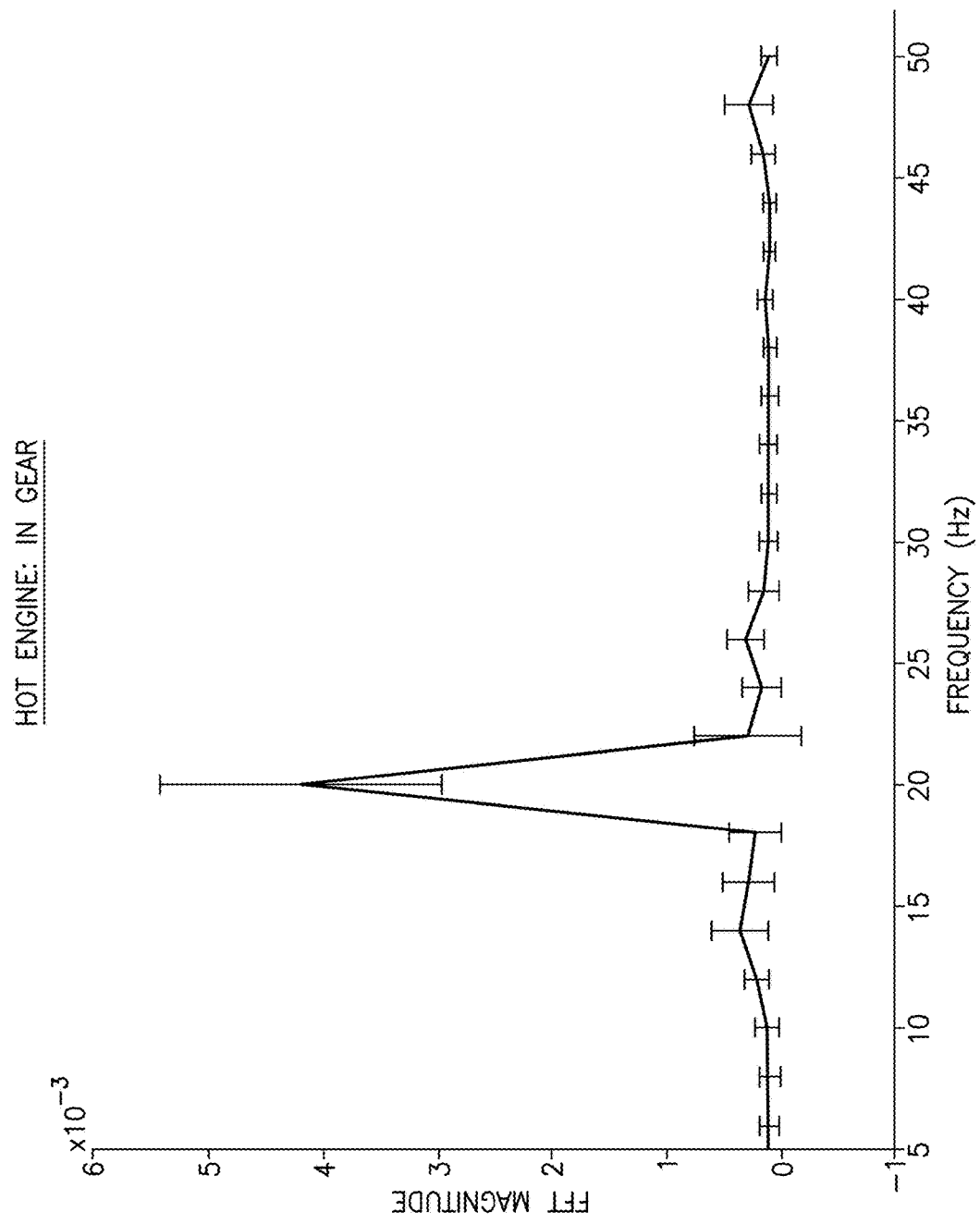
FIG. 9 is a chart plotting FFT magnitude vs. frequency for a vehicle with a hot engine in gear.

The frequency shift from 10 Hz is due to the increased crankshaft speed to help warm up a cold engine. With a hot engine, the 10 Hz peak is not present, perhaps because engine speed is lower than the torque converter's stall speed (see, e.g., FIG. 9). FIG. 9 is a plot showing the Fourier transform results for a vehicle with a hot engine when in gear.

Figure 10:
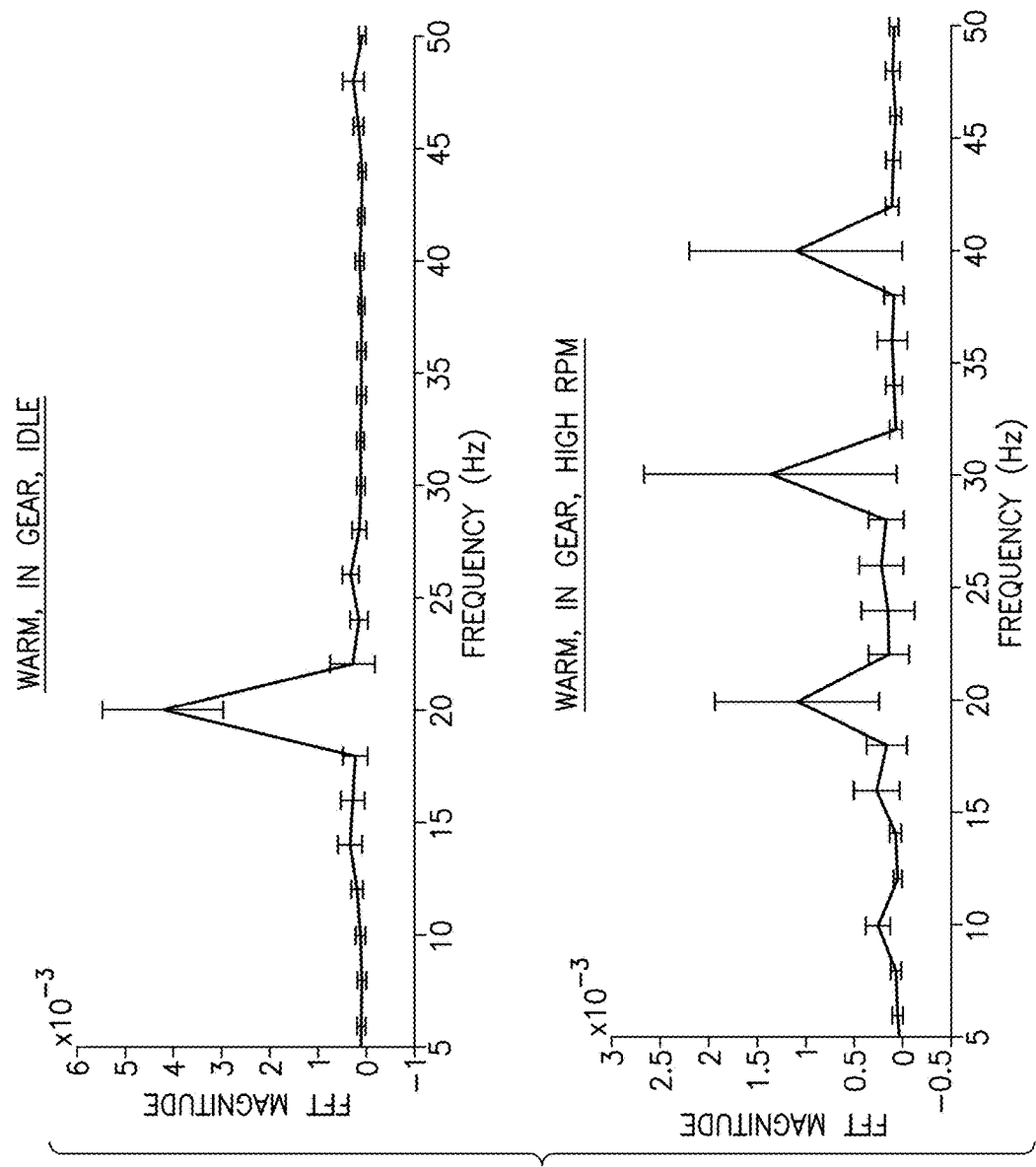
FIG. 10 includes two charts plotting FFT magnitude vs. frequency for a vehicle with a warm engine, in gear, idle (top chart) and a vehicle with a warm engine, in gear, high RPMs (bottom chart).

As a final validation, the experiment was repeated, comparing a warm engine with transmission in gear at idle and brake applied to a warm engine with transmission in gear at elevated RPM. The results clearly indicate a peak at the 10 Hz frequency in the case where throttle is applied, confirming that the peak is due to a transmission rotational component (see, e.g., FIG. 10). FIG. 10 is a plot comparing the Fourier results for a warm engine left in gear and with the brake applied for slow idle and elevated engine speed. In the elevated RPM case, the transmission's components engage and a 10 Hz peak appears.

It was, therefore, inferred that the transmission's engagement was closely coupled to the 10 Hz peak, which may explain its presence in the indicated studies.

Figure 11:
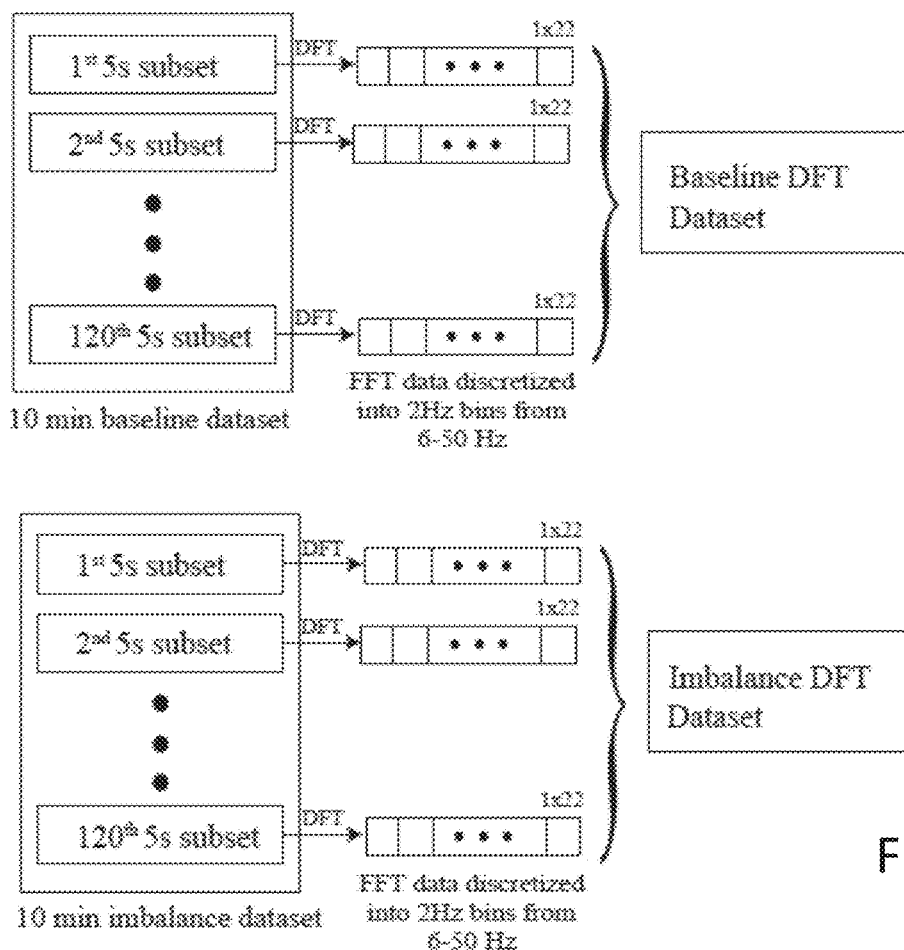
FIG. 11 is a schematic representation of a process for generating a baseline DFT dataset and an imbalance DFT dataset.
Figure 12:
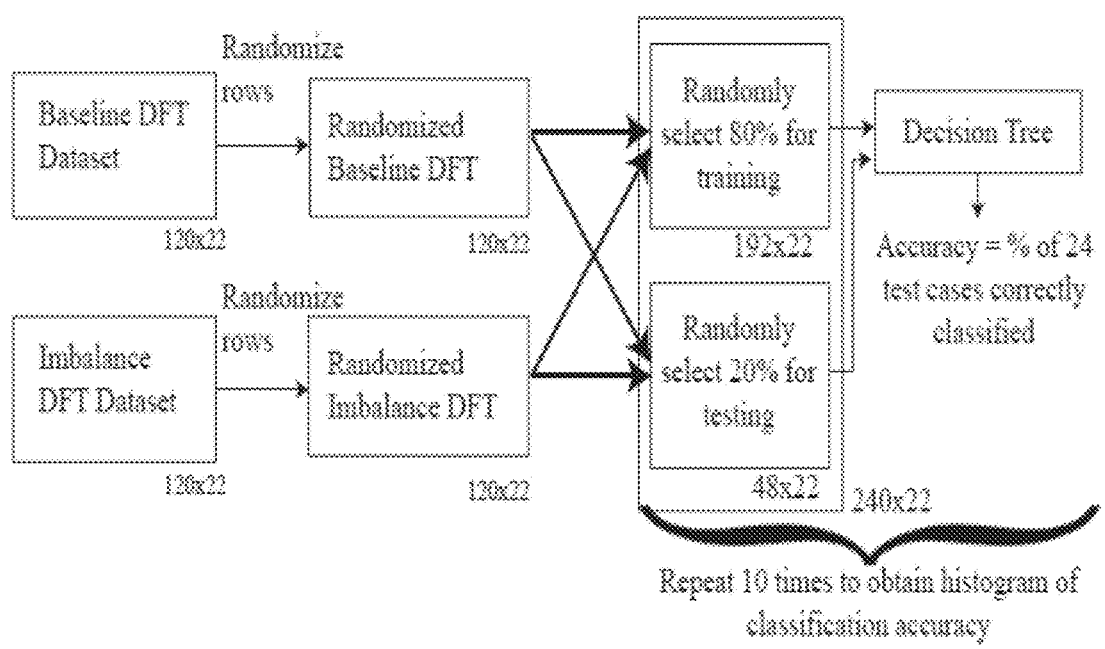
FIG. 12 is a schematic representation of a process for utilizing the baseline DFT dataset and imbalance DFT dataset of FIG. 11 to provide a training set and a test set to a decision tree algorithm.

In a typical implementation, the system (e.g., 314) utilizes a decision tree algorithm to detect wheel imbalance from the spectral analysis of accelerometer data. FIG. 11 and FIG. 12 represent an exemplary process of feature selection, segmentation of the dataset into sub-sets for training and testing the algorithm and a metric for measuring classification accuracy.

At the beginning of the indicated process (see FIG. 11), there was a 10 minute baseline dataset and a 10 minute imbalance dataset. Each of these datasets as divided into 120 5 second data subsets. A Fourier transform was applied to each data subset to produce a baseline discrete Fourier transform (DFT) dataset and an imbalance DFT dataset, each of which comprised 120 1×22 vectors, with FFT data discretized into 2 Hz bins from 6-50 Hz.

Figure 13:
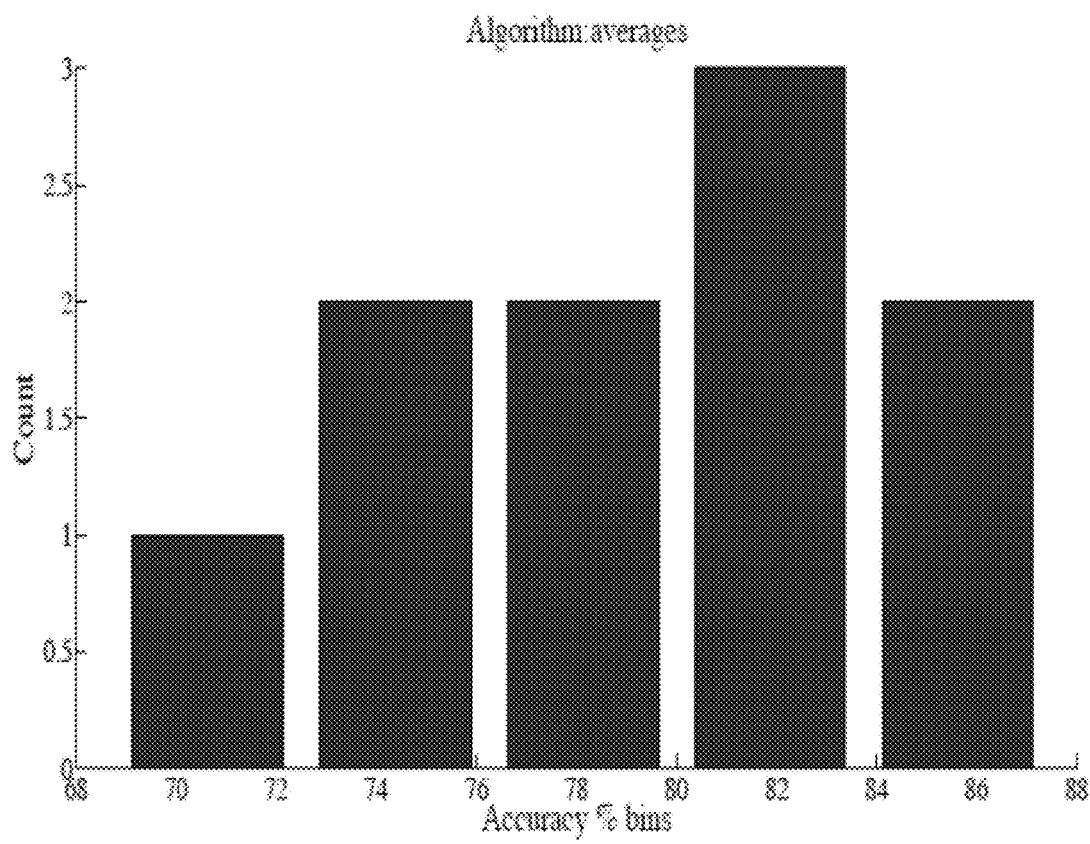
FIG. 13 is a histogram representing classification accuracy when using only FT features.

Next (in FIG. 12), the rows of the baseline DFT dataset and the imbalance DFT dataset were randomized to produce a 120×22 randomized baseline DFT dataset and a 120×22 randomized imbalance DFT dataset. Randomly, 80% of these datasets (192×22) were selected to train the system (e.g., the decision tree), and 20% of these datasets (48×22) were selected for testing. This was repeated 10 times to compute a histogram of classification accuracy (see, e.g., FIG. 13). It was observed that the accuracy was between 70-88% with a weighted average of 79.25%.

Figure 14:
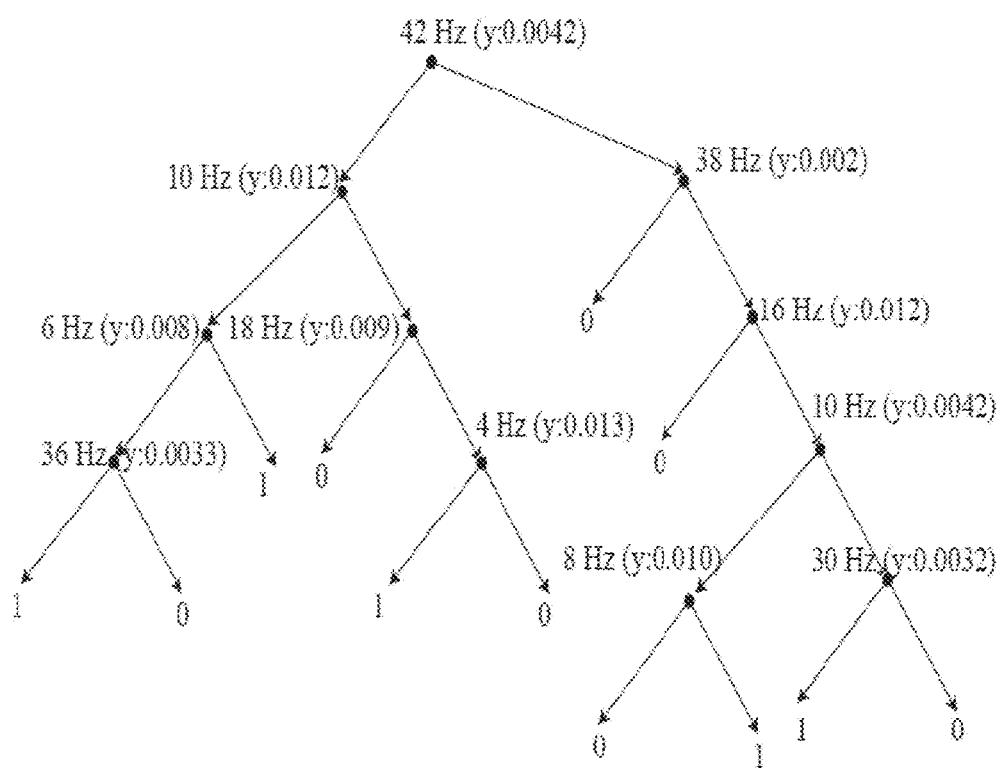
FIG. 14 is a schematic representation of a decision tree algorithm when only using FT features for classification.

FIG. 14 shows an example of the decision tree that was generated in this regard. More specifically, the decision tree was generated using the FFT data as features. In the illustrated decision tree, if the FFT magnitude at a particular node is less than y, then the left branch is chosen, otherwise the right branch is chosen. The algorithm uses Fourier Transform magnitudes of the following frequencies (Hz) to make branching decisions for the tree in decreasing order of importance: 42, 10 & 38, 6 & 16 & 18, 4 & 10 & 36, 8 & 30. The statistical significance of the differences in Fourier Transform magnitudes, between the baseline and imbalanced cases, at these frequencies is listed in Table 2, below.

TABLE 2

Student t-statistics for Fourier Transform feature frequencies used in decision tree training

| Freq (Hz) | t-stat | Magnitude Diff. ($\alpha = 0.05$) |
|---|---|---|
| 42 | 4.0475 (d.o.f 118) | Significant |
| 10 | 2.2454 (d.o.f 118) | Significant |
| 38 | 2.1805 (d.o.f 118) | Significant |
| 6 | 5.9985 (d.o.f 118) | Significant |

TABLE 2-continued

Student t-statistics for Fourier Transform feature frequencies used in decision tree training

| Freq (Hz) | t-stat | Magnitude Diff. ($\alpha = 0.05$) |
| --- | --- | --- |
| 16 | 0.744 (d.o.f 118) | Not Significant |
| 18 | 1.2384 (d.o.f 118) | Not Significant |

Referring back to FIG. 5, it seemed surprising that the tree (of FIG. 14) assigned the most importance to the 42 Hz feature for classification while completely ignoring the statistically significant visible peaks at 14 and 28 Hz in the imbalanced case. The difference between the FFT magnitudes between the baseline and imbalanced case for the chosen frequencies of 16 and 18 Hz are not statistically significant either. Furthermore, the decision tree itself is quite complex consisting of at least 5 levels. To improve confidence in the tree's performance, focus was turned toward improving the features being used for tree training and testing.

In the subsequent section of this application, a Principal Component Analysis (PCA) transformation of the FFT data is discussed that was applied to generate a feature space having greater separability between the baseline and imbalanced cases.

Figure 15:
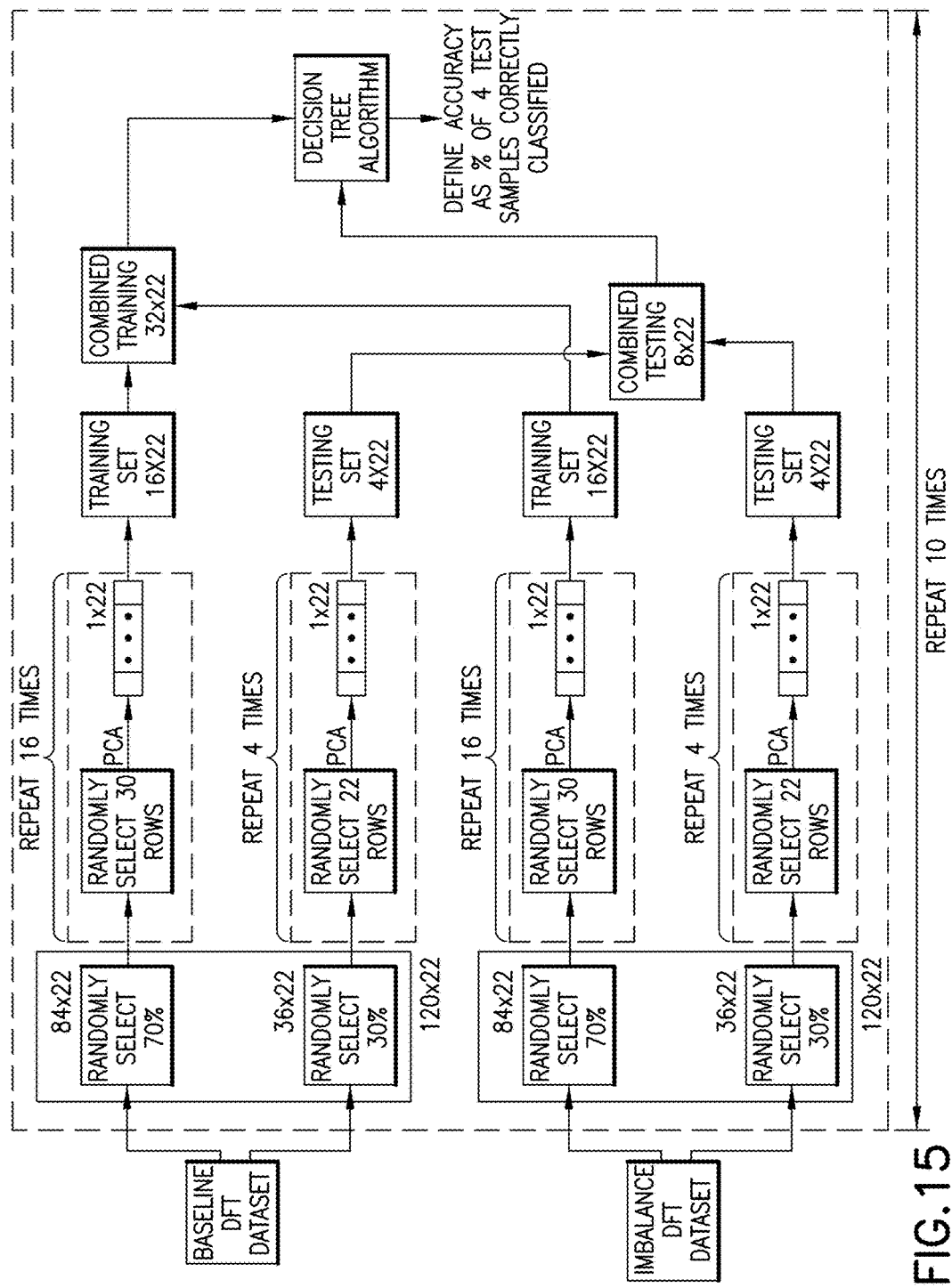
FIG. 15 is a schematic representation of a process for utilizing the baseline DFT dataset and imbalance DFT dataset of FIG. 11 to provide a training set and a test set to a decision tree algorithm and subjecting it to a PCA transformation prior to providing a training and testing set for classification.

FIG. 11 and FIG. 15 shows the steps that were taken for feature generation using a PCA transform, and selection of training and test sets for the decision tree algorithm.

The processes of FIG. 11 were discussed above and produced a baseline DFT dataset and an imbalance DFT dataset. Referring now to FIG. 15, each of these datasets were randomly divided into a randomly selected 70% (84×22) and a randomly selected 30% (36×22). 30 rows were selected randomly from each 84×22 dataset and PCA was applied to produce a 1×22 vector. The 1×22 vector represented the projection of FFT data along the most significant PCA component direction. This process was repeated 16 times to create a baseline training set and an imbalance training set, each of which was 11.6×22.

Similarly, 22 rows were selected randomly from each 36×22 dataset and PCA was applied to produce a 1×22 vector. The 1×22 vector represented the projection of FFT data along the most significant PCA component direction. This process was repeated 4 times to create a baseline testing set and an imbalance testing set, each of which was 4×22.

The baseline training set and the imbalance training set were combined to produce a combined training set that was 32×22. Similarly, the baseline testing set and the imbalance testing set were combined to produce a combined testing set that was 8×22.

Figure 16:
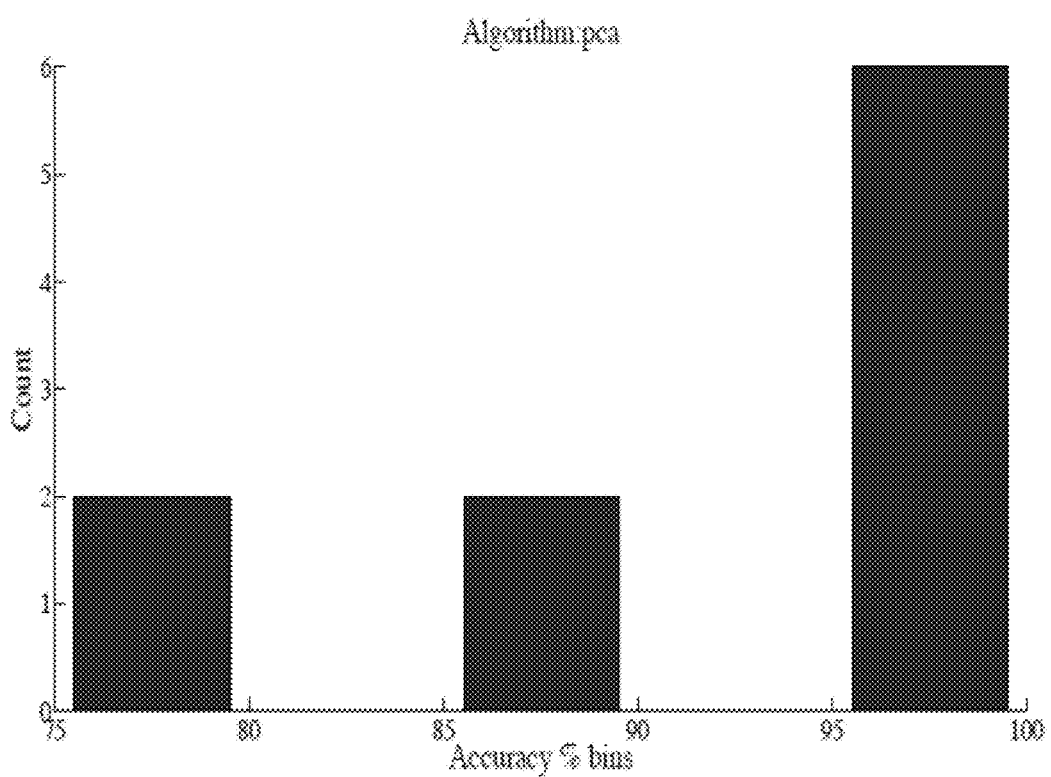
FIG. 16 is a histogram representing classification accuracy when using the PCA transformed FT features for classification.
Figure 17:
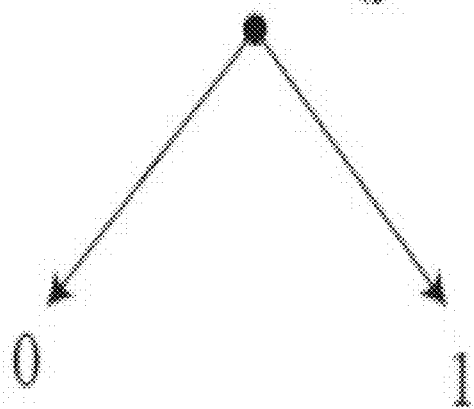
FIG. 17 is a schematic representation of a decision tree algorithm when using the PCA transformed FT features for classification.
Figure 18:
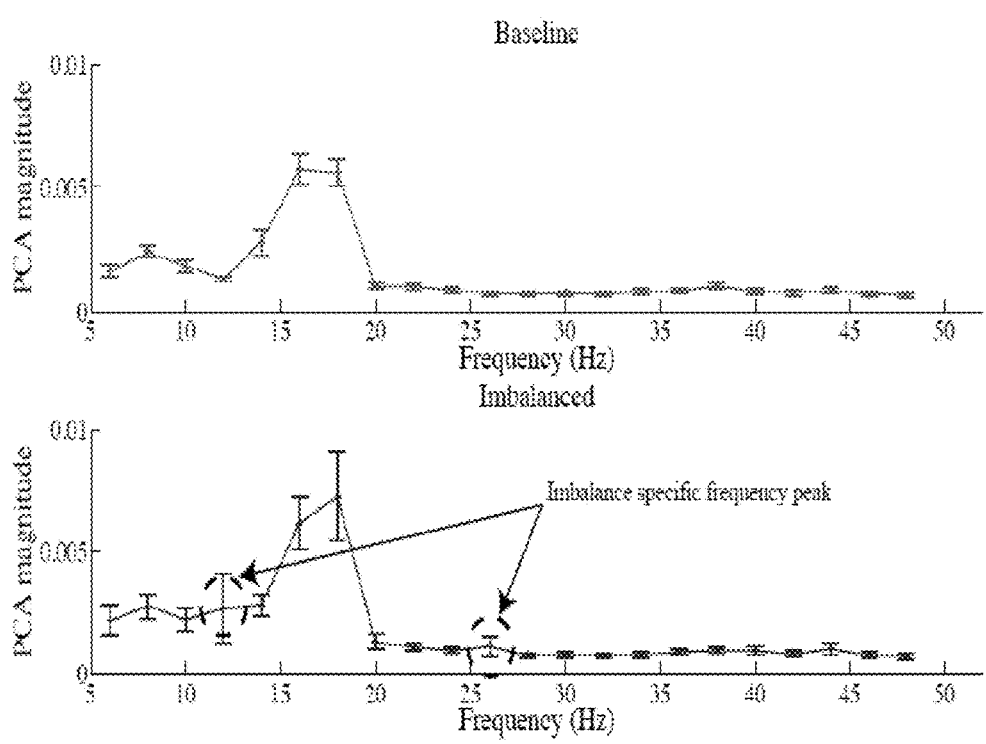
FIG. 18 includes two charts plotting PCA magnitude vs. frequency for a baseline scenario (top chart) and an imbalanced scenario (bottom chart).

These combined sets (i.e., the combined training set and the combined testing set) were applied to the decision tree algorithm. A histogram of classification accuracy was computed as illustrated in FIG. 16. As can be seen, there was a significant improvement in classification accuracy from adding the PCA step with a weighted average of 91.6%. Also, the resulting decision tree, shown in FIG. 17, was only 1 level and used the PCA transformed magnitude at 12 Hz to classify state. Moreover, referring to FIG. 18, there was a peak at 12 Hz for the imbalance case, and a corresponding trough in the baseline case, which is further confirmed by a statistically significant student's t-test ($t_{stat}$=4.0791 for 18 d.o.f at $\alpha$=0.05). It can be seen, therefore, that the PCA transformation of the FFT data significantly boosts the ability of the decision tree to detect the presence of a wheel imbalance.

While good detection of wheel imbalance using smartphone acceleration data has been demonstrated here, it is important to consider the universal applicability of this technique to vehicles of different makes, different road conditions and variation in vehicle speed due to variable traffic flow conditions. In this section, we examine the sensitivity of the approach set forth herein to these variables.

Figure 19:
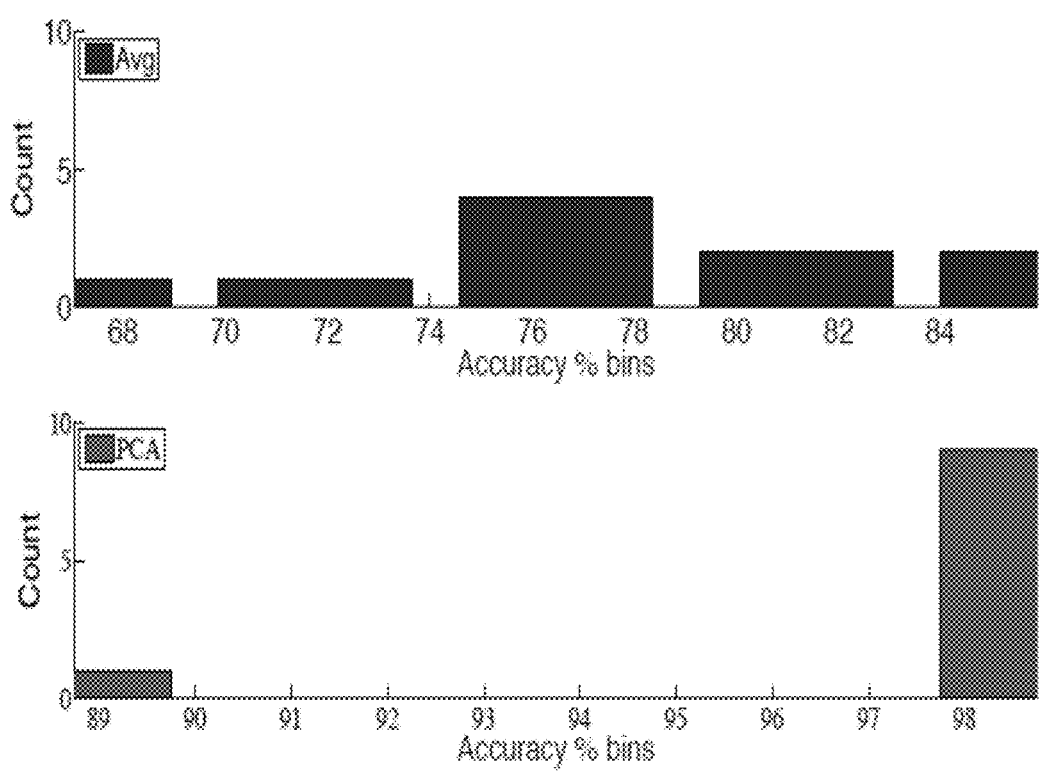
FIG. 19 includes two charts plotting count vs. accuracy % bins for Avg (top chart) and PCA (bottom chart).

Some of the test results discussed above were obtained by driving a 2015 Subaru Impreza Hatchback vehicle on a stretch of highway connecting Boston, Mass. and Albany, N.Y. Another set of experiments was conducted using a Nissan Versa vehicle on a stretch of highway connecting Boston, Mass. and Kittery, Me. This vehicle was driven at a controlled speed of 60 mph as well. The only other difference of any significance was that for this series of experiments we mounted 4¼ ounce weights on the front left and rear right tire to simulate imbalance conditions. FIG. 19 illustrates the classification accuracy using a decision tree learning algorithm when using Fourier Transform features and PCA transformed Fourier features. Superior classification accuracy was observed using the PCA transformed Fourier data in this case as well with a weighted average accuracy of 70% and 97.6% without and with using the PCA transformation, respectively. These results indicate that smartphone accelerometer data can be used successfully to classify imbalance for at least 2 common passenger vehicles of comparable class, and with low mass.

Figure 20:
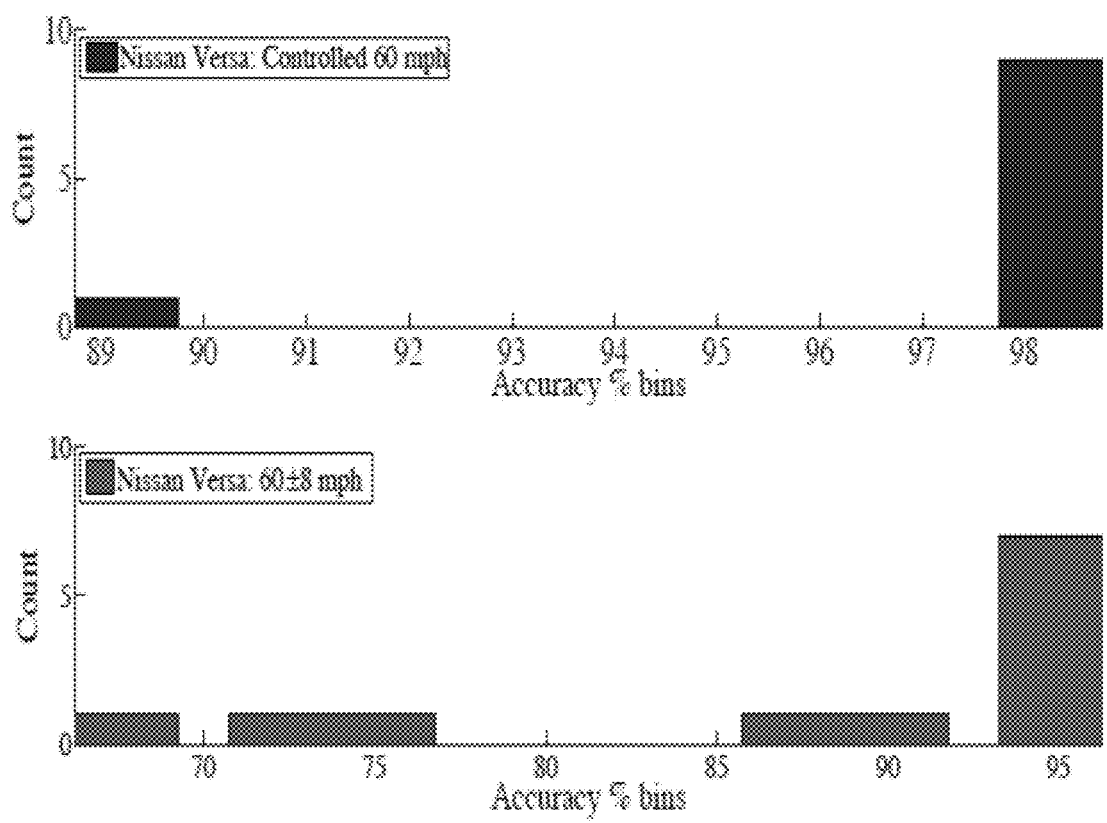
FIG. 20 includes two charts plotting count vs. accuracy % bins fir two different vehicles and driving situations.
Figure 21:
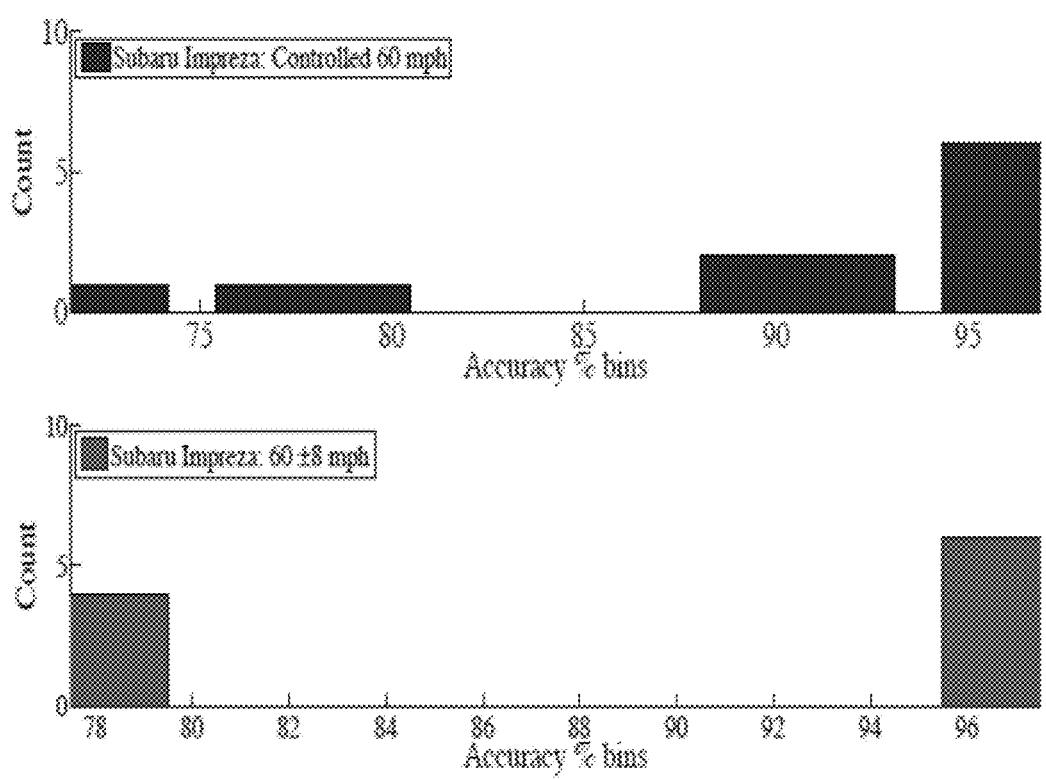
FIG. 21 includes two charts plotting count vs. accuracy % bins fir two different vehicles and driving situations.

Additionally, the experiments were conducted by driving at a controlled speed of 60 mph. In general, traffic flow conditions may cause variations in speed brought about by lane changing, breaking and/or accelerating. Another set of experiments was conducted, this time allowing vehicle speed variations of +/−8 mph. We considered the case where the decision tree is trained with PCA transformed FT features due to its better classification accuracy. FIG. 20 and FIG. 21 illustrate the change in classification accuracy for the Subaru Impreza and Nissan Versa vehicle under variable vehicle speed conditions. Although variations in speed do seem to impact classification accuracy, the variation in weighted accuracy (from 97.6%-89.45% for the Nissan Versa and 91.2%-89.8% for the Subaru Impreza) was within 10%. Therefore, it seems that the trade-off between accuracy and need for controlled vehicle speed, in regard to detecting wheel imbalance, can be considered acceptable.

In some implementations, the system 314 is configured to determine pressure in individual and/or all tires and/or to determine tread condition (not just failure or excessive wear) and/or to determine if a vehicle where the mobile personal computing device is placed is experiencing or developing tire pressure problems and/or has excessive tread wear on the vehicle's tires.

The theory behind tire pressure inference by the system 314 relies on the physical model of a tire. The effective rolling radius of a tire depends on the tire construction, loading, pressure, sidewall stiffness, and angular velocity (due to centrifugal forces). A change in any of these factors may impact the tire radius, thereby altering the number of rotations required to travel a fixed distance. Factors other than pressure typically can be controlled or accounted for; measuring after tires are warmed up eliminates temperature effects, while identifying the uniformity or lack of uniformity of tire diameters across all four wheels/tires of the vehicle can differentiate pressure changes from wear-related changes.

From the formula $v = r * \omega$ where v is the velocity at the tire surface, r is the tire's effective rolling radius, and $\omega$ is the rotational frequency of the tire, one sees that if $\omega$ remains constant but r increases, v increases. The opposite relationship also holds true, with decreasing radius and decreasing linear velocity. The difference between angular and linear velocities is a key to identifying small changes in diameter, and therefore changes in pressure or wear. As the linear peed changes relative to the angular speed, changes in radius—and therefore pressure—may be identified/inferred.

In the system 314 of FIG. 3, the mobile personal computing device is capable of determining and comparing actual and predicted wheel rotational speeds. In this regard, the accelerometer and geolocation module (e.g., a GPS receiver) provide two inputs to this determination: 1) vibration data (from the accelerometer) that can be used to determine (e.g., with a processor of the system) true wheel rotational frequency, and 2) data (e.g., time stamped location data) from the GPS, which provides a time-series of locations that can be used to calculate the true ground speed. The true wheel speed and the nominal tire circumference (which may be entered into the system by a user—e.g., from the mobile personal computing device—and/or stored in the system's memory) may be used to identify the expected speed of the vehicle (if the tires were properly inflated); and comparing this result to the GPS-calculated velocity can reveal changes in tire circumference relative to the originally manufactured and/or specified tire circumference. The ratio between the expected vehicle speed and the true vehicle speed is a useful predictor of effective tire circumference, and therefore radius and pressure.

Other features, such as the width of the frequency spread near the wheel's rotational frequency, may provide additional information relating to the number of wheels that may be experiencing abnormal (low or high) pressures. In addition, we believe that over or under inflated tires may exhibit small oscillations about the tire rotational frequency that may be detected in the accelerometer response.

Figure 22:
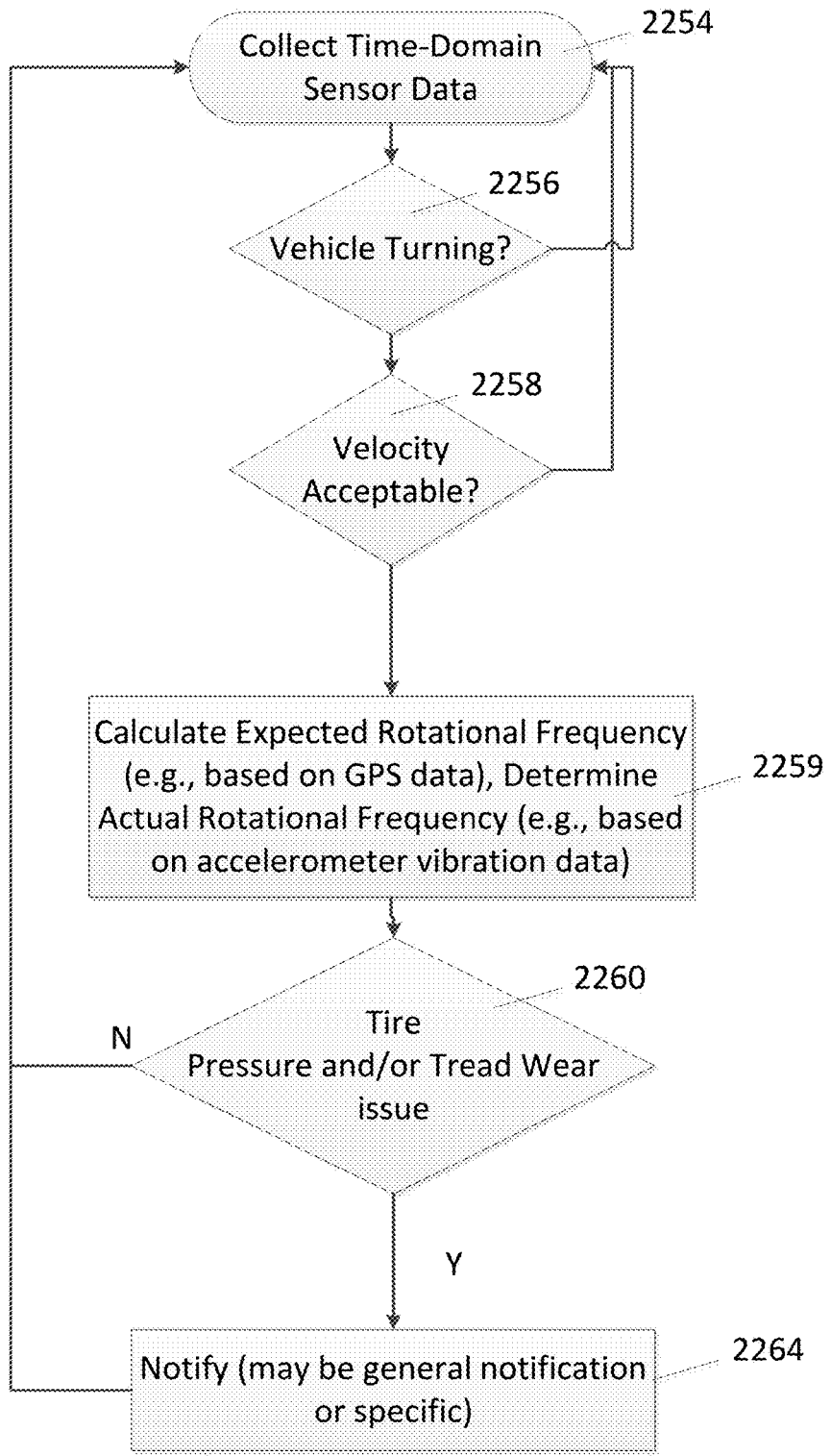
FIG. 22 is a flowchart of an exemplary process to facilitate detecting faults (i.e., tire pressure problem or excessive tread wear) in a vehicle's suspension.

FIG. 22 is a flowchart showing an exemplary process to facilitate detection of tire pressure issues (e.g., too low pressure or too high pressure) in a tire of a moving vehicle. In a typical implementation, one or more (or all) of the steps represented in the illustrated flowchart would be performed (or facilitated) by the system 314 while the mobile personal computing device 104 is in, on, or in contact with the vehicle 100 and while the vehicle 100 is being driven. More particularly, in various implementations, the steps of the represented process may be performed by the mobile personal computing device 104 alone or in combination with the remote processing system 318. Any references to processors, memory, or the like, in the following description should be understood as referring to the processor and memory in either one or both of the mobile personal computing device 104 or the remote processing system 318.

The process represented in the flowchart includes collecting (at 2254) time-domain data from one or more of the sensors in the mobile personal computing device 104. In some implementations, this would include, at least, collecting a sequence of time-domain vibration data with the accelerometer 322 in the mobile personal computing device 104, and collecting a sequence of time-domain position data with the geolocation module 324 in the mobile personal computing device 104. In various implementations, other types of time-domain data (e.g., gyroscope data) may be collected by other types of sensors as well. The time-domain vibration and position data collected by the sensors is related to and representative of the vehicle's motion (i.e., vibration and position/location).

Although shown as a discrete step in the illustrated process, in a typical implementation, the time-domain data is collected in a relatively ongoing and continuous manner from the various sensors in the mobile personal computing device 104.

In steps 2256 and 2258, the system excludes any data that may have been collected while the vehicle was turning (similar as discussed above) or if the data was collected while the vehicle was driving too slowly (as also discussed above).

Next, according to the represented process, the system 314 (at 2256) engages in data preprocessing. This (optional) step may include a wide variety of possible actions including, for example, the data windowing/filtering processes disclosed above.

Next, according to the illustrated process, a processor of the system 314 (at 2259) calculates an expected rotational frequency of the vehicle's tires if fully inflated (based, for example, on time-stamped GPS longitude and latitude data provided by the geolocation device 324 of the mobile personal computing device 104 and information (e.g., tire diameter) about the vehicle's tires), and estimates the actual rotational frequency of the vehicle's tires (based, for example, on vibration data from the accelerometer 322 of the mobile personal computing device 104). The information about the vehicle tires could be manually inputted (e.g., via a user interface), derived from a vehicle identification number (VIN), or even learned, for example.

To calculate the expected rotational frequency of the vehicle's tires if fully inflated (based, for example, on time-stamped GPS longitude and latitude data), one or more pairs of these time-separated, time-stamped latitude and longitude estimates may be used to calculate an expected wheel rotational frequency ($f_{k,j}$). In this regard, for example, the expected wheel rotational frequency ($f_{k,j}$) can be calculated (e.g., with a processor of the system 314) with the following equation:

$$f_{j,k} = \frac{H_d(Lat_k - Lat_j, Long_k - Long_j)}{2\pi D(t_k - t_j)},$$

in which $H_d$ is or approximates a Haversine distance computed using two pairs of latitude and longitude coordinates $Lat_k$ and $Long_k$ are the latitude and longitude coordinates at time $t_k$, $Lat_j$ and $Long_j$ are the latitude and longitude coordinates at time $t_j$, and D is the nominal diameter of the car tire. Typically, time $t_k$ for a particular calculation will be different than time $t_j$ for that calculation, with the difference being anywhere from a fraction of a second (e.g., 0.1 seconds) to a few seconds or more. In a typical implementation, the system 314 iteratively recalculates rotational frequency ($f_{k,j}$) as new GPS data becomes available.

Next, in the illustrated process, the system 314 (at 2260) determines whether there is a tire pressure and/or tread wear issue.

In some implementations, this determination is made, at least in part by comparing the expected rotational frequency and the actual rotational frequency, which should, in theory, be equal or at least very close if all of the tires are fully inflated and not unduly worn. Moreover, in a typical implementation, this feature (i.e., the ratio between expected rotational frequency and actual rotational frequency) is part of a larger set of features that the system may use to ensure robust classification. For example, in some implementations, the system 314 incorporates other features such as the three dominant frequency peaks, bandwidth, etc. to provide additional differentiating ability. While, in general, the ratio between expected rotational frequency and actual rotational frequency alone can determine all low/all high fairly well, the system 314 may use one or more of the other features to yield higher accuracy when trying to identify the number and location of a specific anomalous wheel.

In some implementations, a mismatch between the expected rotational frequency and the actual rotational frequency may be considered sufficient to warrant a user notification (if, for example, the mismatch is greater than 2%, 3%, 4% or 5%).

In some implementations, determining whether there is a tire pressure and/or tread wear issue involves applying one or more of these (and/or other features) to a decision tree algorithm.

If the system 314 determines (at 2260) that the expected rotational frequency and the actual rotational frequency are not sufficiently mismatched to warrant a user notification, then the system 314 simply keeps collecting time-domain sensor data and processing that data as described.

If the system 314 determines (at 2260) that the expected rotational frequency and the actual rotational frequency are sufficiently mismatched to warrant a user notification, then, in some implementations, the system (at 2264) may produce a notification (e.g., push notification, text message, email message, audio message, etc.) for the vehicle owner or driver to consider having his or her tires checked (e.g., for proper pressure and/or excessive wear).

In some implementations, if the system 314 determines (at 2260) that the expected rotational frequency and the actual rotational frequency are sufficiently mismatched to possibly warrant a user notification, then the system either produces that notification or attempts to differentiate whether there is a tire pressure problem or excessive tread wear. There are a variety of ways in which this can be done and features that may be relevant to this determination. For example, as discussed elsewhere herein, the system 314 may consider width of the frequency spread (of FFT/PCA data) at or near the wheel's rotational frequency to provide additional information relating to the number of tires. Also, or alternatively, the system 314 may refer to operating history of the vehicle, and/or temperature information to inform its assessment. In a typical implementation, this processing functionality may be implemented via the decision tree algorithm. In some implementations, all possibly relevant features (including, e.g., expected rotational frequency, actual rotational frequency, peak bandwidth information, historical data, and/or temperature data) are fed into the decision tree algorithm to produce a result.

The system 314 (at 2264) notifies the vehicle owner or driver about the identified connection.

An experiment was conducted to determine whether a mobile personal computing device (e.g., a smartphone) could be used to effectively identify abnormal (low or high) individual tire pressure changes in this regard.

In the experiment, an iPhone 5S was mounted in an iOttie windshield mount of a 2015 Kia Optima, in a configuration similar to the one represented in FIG. 2. The vehicle was warmed up to ensure the tires were at operating temperature. Then, the vehicle was driven on a straight, smooth road at a constant 100 kph based on the GPS velocity to eliminate pressure-based variance. A software application (on the smartphone) recorded accelerator data at 100 Hz and recorded GPS data at 1 Hz for training and testing.

The vehicle was driven with the tires in in five different conditions: all tires low pressure, only front-left tire at low pressure, all tires at normal pressure, only front-left tire at a high pressure, and all tires at a high pressure. The pressure values for each state are shown in Table 3, below, where all pressures are shown in psi (pounds per square inch).

TABLE 3

|  | FL | FR | RL | RR |
|---|---|---|---|---|
| All Low | 30 | 30 | 30 | 30 |
| One Low | 30 | 37 | 37 | 37 |
| Normal | 37 | 37 | 37 | 37 |
| One High | 42 | 37 | 37 | 37 |
| All High | 42 | 42 | 42 | 42 |

The front left was chosen as a wheel to vary pressure because the front left tire is a driven and steering tire, thus pressure monitoring is quite important for that tire.

In this experiment, data were filtered as follows: GPS data were time-averaged over a window to determine the vehicle's velocity, and samples outside a narrow window (e.g., from 92 to 110 kph were discarded (i.e., not used to assess tire pressure or tread wear). A Fourier transform (FT) to the windowed, time-averaged data. The resulting FT data were similarly bounded from 12.5-14.5 Hz, to ensure that the peak identified was due to the wheel or wheels rotational frequency. Data were also normalized against the Fourier-informed velocity to enhance the visibility of the trend and remove spurious data points and outliers.

As outlined above, tire pressure state can be detected/inferred by computing the ratio of $f_{GPS}/f_{ACC}$. This section discusses how the raw GPS and accelerometer data may be processed to support this theory.

Figure 23:
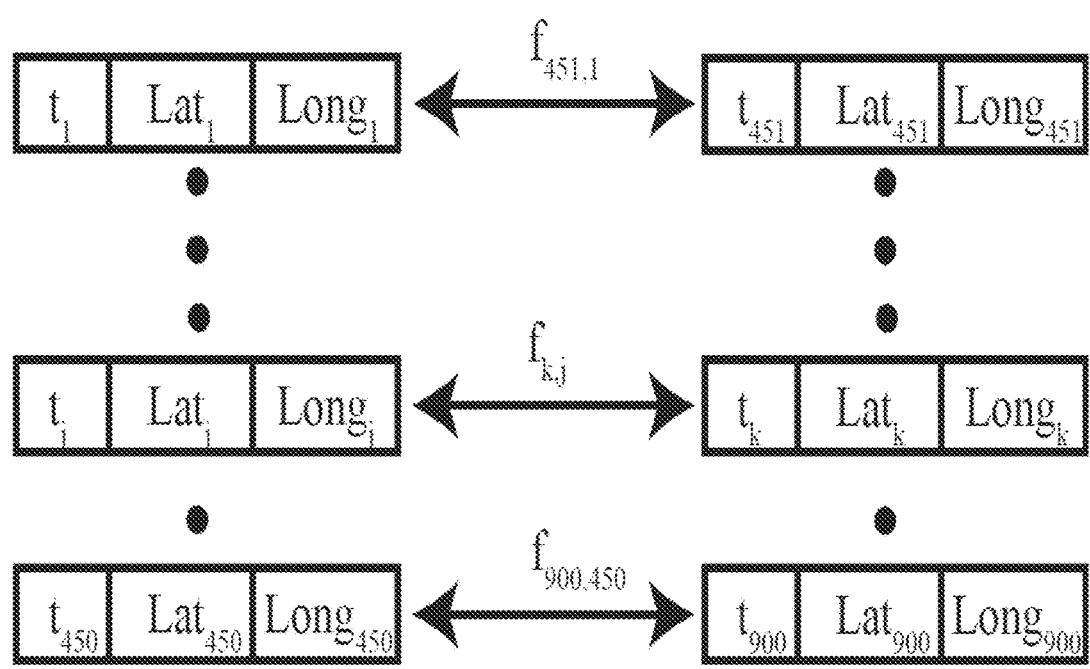
FIG. 23 is a schematic representation of a method for calculating wheel rotational frequencies based on a plurality of time-stamped GPS latitude and longitude data points.

In the above-mentioned experiment, the iPhone sampled GPS latitude and longitude at approximately 1 Hz. In 15 minutes, this produced 900 time•stamped latitude and longitude estimates. This dataset was split in half and corresponding rows between the two halves were used to get 450 estimates of wheel rotational frequency as represented in FIG. 23.

For each of the 450 combinations of latitude and longitude, wheel rotational frequency ($f_{k,j}$) was calculated (e.g., with a processor) based on the following equation:

$$f_{j,k} = \frac{H_d(Lat_k - Lat_j, Long_k - Long_j)}{2\pi D(t_k - t_j)},$$

in which $H_d$ is or approximates a Haversine distance computed using two pairs of latitude and longitude coordinates $Lat_k$ and $Long_k$ are the latitude and longitude coordinates at time $t_k$, $Lat_j$ and $Long_j$ are the latitude and longitude coordinates at time $t_j$, and D is the nominal diameter of the car tire.

Hd was assumed to be the vectorial distance between two pairs of latitude and longitude coordinates. This assumption was considered valid since the test was conducted on a relatively straight stretch of highway. However, to eliminate the occasional spurious computation, as a result of minor roadway curves or bends, velocity computations less than 92 Kph or greater than 110 Kph were discarded (i.e., not used to assess tire pressure or tread wear issues).

In essence, the system 314, in this example, assumes that the transit between the lat/lon pairs can be modeled as a straight line without introducing undue error. Further, when GPS is operated at low speeds, it tends to "dither" (move about due to signal errors or multipath). By bounding to higher speeds, we ensure that the distance travelled is significantly greater than the dithered distance. In this case, the signal >> noise. The high-end bound may ensure that the frequencies of interest don't vary too much outside the ~13-16 Hz preferred window, and because other factors such as wind-induced vibration might start to occur.

Table 4 shows the mean predicted tire rotational frequency and standard deviation for all 5 test cases.

TABLE 4

STATISTICS OF GPS PREDICTED WHEEL ROTATIONAL FREQUENCY

| Case | $f_{mean}$ (Hz) | $f_{std}$ (Hz) |
|---|---|---|
| All low | 12.84 | 0.18 |
| FL low | 13.31 | 0.07 |
| Normal | 12.86 | 0.26 |
| FL high | 13.43 | 0.14 |
| All high | 13.43 | 0.06 |

Notice that as tire pressure increases, the mean predicted rotational frequency tends to increase. In fact, the difference in rotational frequency between the All Low and All High case is statistically significant (t $Stat_{95\%}$=69.9) indicating that these two states can be differentiated using this metric alone. The other cases, with their higher standard errors and relatively closely spaced means, may warrant further analysis.

Figure 24:
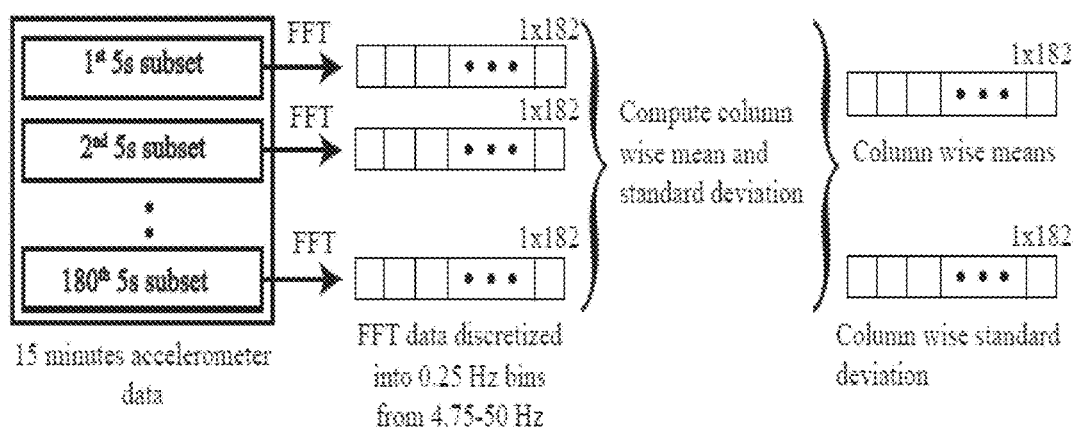
FIG. 24 is a schematic representation of a process for computing mean and standard deviation associated with a series of accelerometer data points.

For each of the 5 test cases, the iPhone collected x, y, and z acceleration data for 15 minutes at approximately 100 Hz. The 15 minutes of collected data in each test case were divided into 5 second windows, resulting in 180 windows of 5 seconds each. Next, a fast Fourier Transform (FFT) (1×182) was generated for the accelerometer data associated with each of these 180 windows. The FFT data was discretized into 0.25 Hz bins from 4.75 Hz-50 Hz. Finally, a column wise mean of the FFT data (1×182) and a column wise standard deviation of the FFT data (1×182) per frequency component were calculated. This process is represented schematically in FIG. 24.

Figure 25:
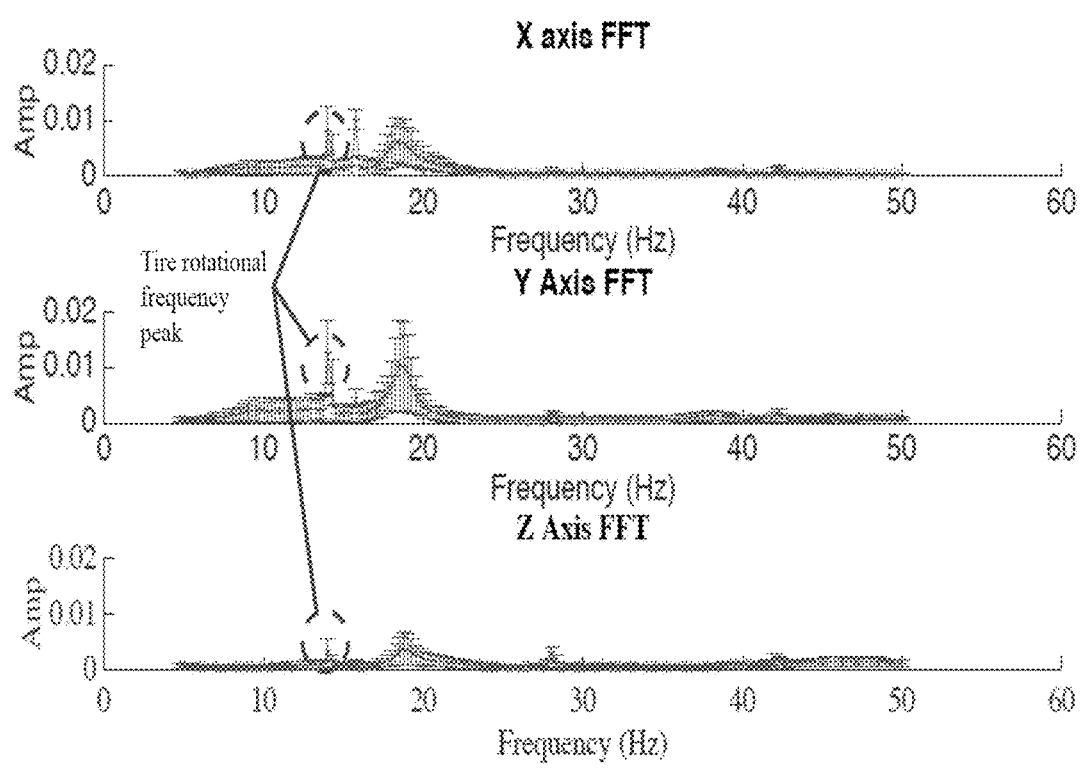
FIG. 25 includes three charts plotting Amps vs. frequency for tire rotation frequency measurements in three different axes with the mean and standard deviation of the 182 data points in FIG. 24.

The mean Fourier Transformed spectrum for the FL Low test case is illustrated in FIG. 25, as an example. It can be observed that although the FT peak corresponding to a tire rotational frequency of 13.6 Hz does manifest in the x, y and z axes spectrum, there is significant standard error associated with these measurements. Some of the other spectral components, such as the peak frequency at 20 Hz, may be attributed to the vibration of the phone mount attached to the windshield.

This section discusses attempts that were made to identify features in the FFT and GPS data that effectively differentiate the five tire pressure states when input into a machine learning algorithm.

Figure 26:
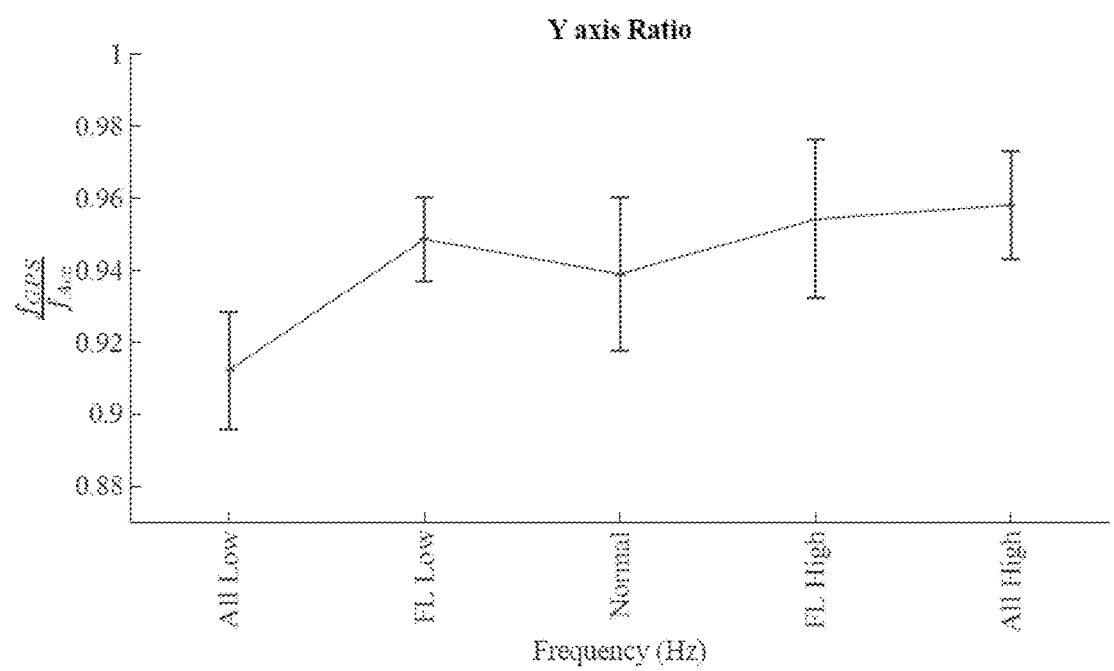
FIG. 26 is a chart plotting the ratio $f_{GPS}/f_{ACC}$ vs. frequency.

First, the utility of GPS and FFT frequency ratios was considered. FIG. 26, which is a plot of the ratio $f_{GPS}/f_{ACC}$ using $f_{ACC}$ peaks from the Y-axis of the accelerometer, shows the utility of ratio $f_{GPS}/f_{ACC}$ for the Y acceleration axis. The Y axis was selected as this is the direction along which the effect of tire rotational frequency will dominate based on the way that the phone was mounted (see, e.g., FIG. 2). One can observe a stark difference between the All Low and All High scenarios. This indicates that the ratio $f_{GPS}/f_{ACC}$ is a valid feature to distinguish these two cases. However, given the large standard errors associated with the measurements, it may not be sufficient to distinguish some of the other cases (e.g., FL Low, Normal and/or FL High) from one another or from All High. Note also that with an increasing numbers of tires at higher pressures, the relative increase in the ratio tapers off. This is because as tire pressure increases, the tire approaches round and further pressure increases do not linearly increase the roundness.

Figure 27:
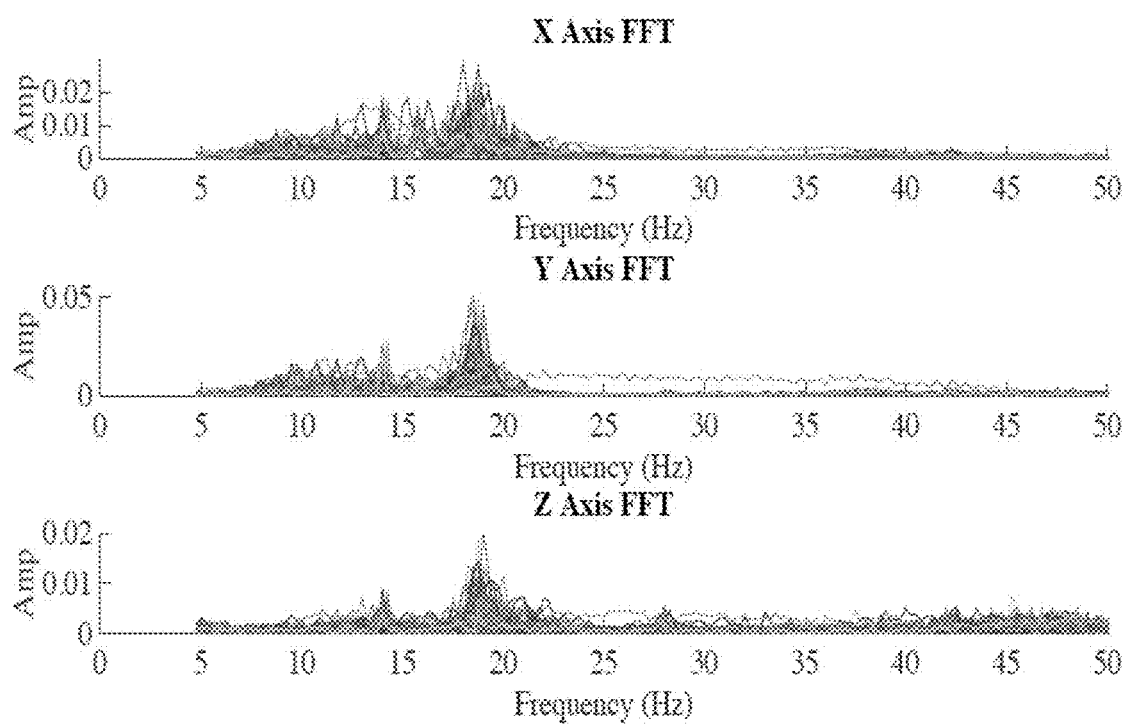
FIG. 27 includes three charts plotting Amps vs. frequency for tire rotation frequency measurements in three different axes with each of the individual 182 FT features in FIG. 24.

Other possibly relevant features were considered as well. The relatively large standard deviations shown in FIG. 26 (represented by the height of each vertical segment in the chart) arise from the variability in GPS data (as presented in Table. 4) as well as the variability in accelerometer data. FIG. 27 shows typical variation in accelerometer FT data across the 180 window samples for the FL Low case as an example. As seen in FIG. 27, there is tremendous variability in the spectrum from one window to the next across all 3 accelerometer axes.

Figure 28:
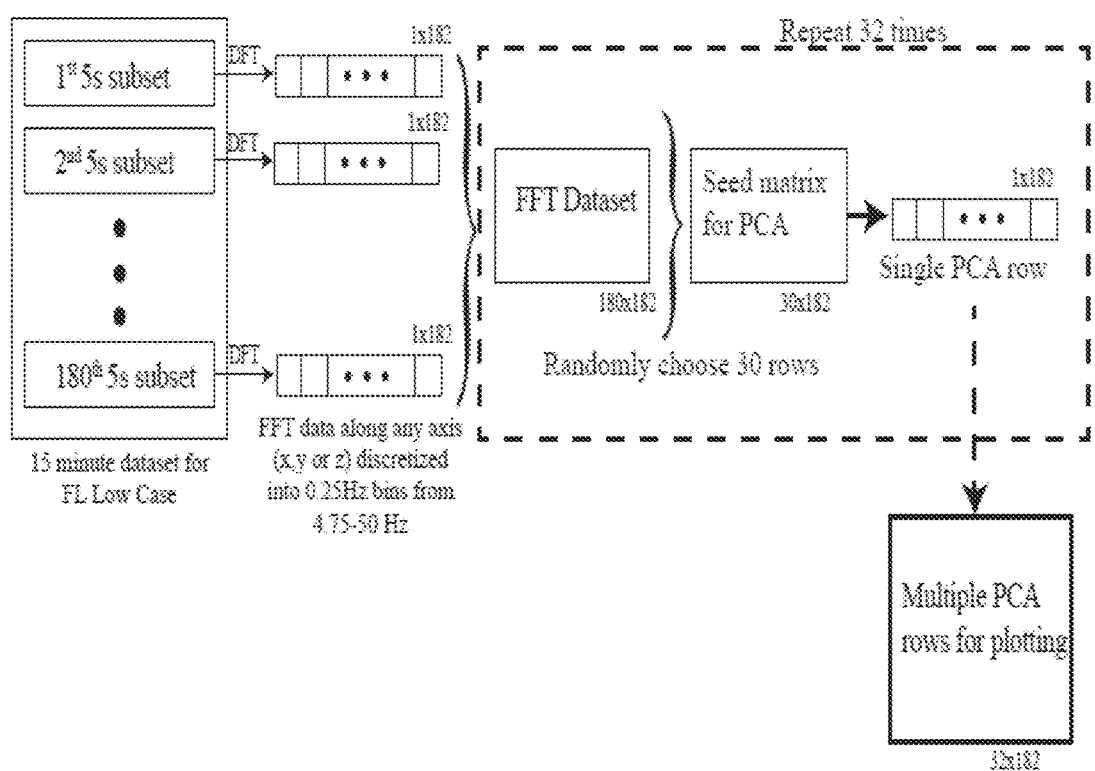
FIG. 28 is a schematic representation of a process for applying FT and PCA to a sensor dataset.

In order to reduce this variability and extract more robust spectral features, a Principal Component Analysis (PCA) transformation of the FT data was performed as per the algorithm presented in FIG. 28. According to the process represented in FIG. 29, a 15 minute dataset for the FL Low case was divided into 180 5 second subsets. Then, a discrete Fourier transform was applied to each subset to produce 180 FFT data subsets (each being 1×182) along any axis (x, y, or z) discretized into 0.25 Hz bins from 4.75 Hz. 30 rows of this 180 member FFT data subset was randomly chosen to seed a matrix for PCA (30×182), which produced a single PCA row (1×182) and multiple PCA rows (32×182) for plotting. In the illustrated process, the most significant principal component direction of the transformed data was chosen.

Figure 29:
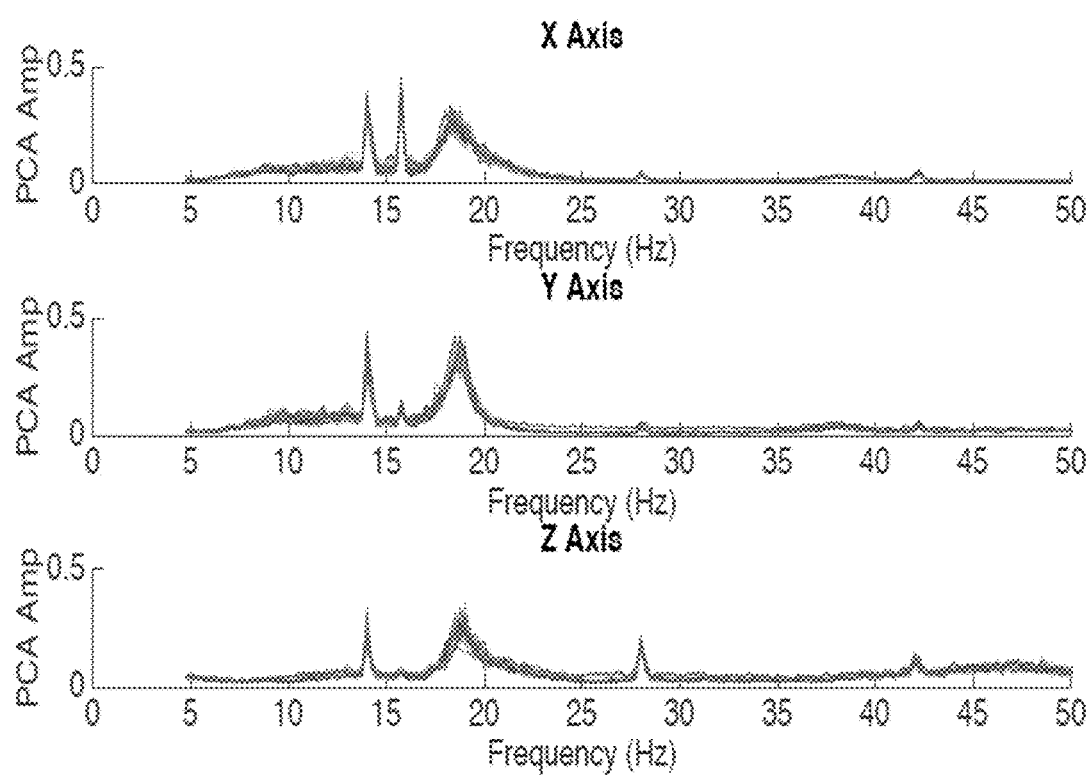
FIG. 29 includes three charts plotting PCA Amps vs. frequency for tire rotation frequency measurements in three different axes.

FIG. 29 shows the PCA transformed FT features of the same FL Low case. From the illustrated figure, it can be seen that the variability in the data was drastically reduced allowing simplified discernibility of peaks of interest. Note that the peak amplitude in the 25-32 Hz range for the Z direction was significantly higher than the X and Y components, thus, presenting another discriminating feature. It is believed that this is due to wobble felt due to the inequality in pressure, and hence tire diameter, between the front left and front right tire that would manifest itself in the Z axis acceleration.

Figures 30, 30A:
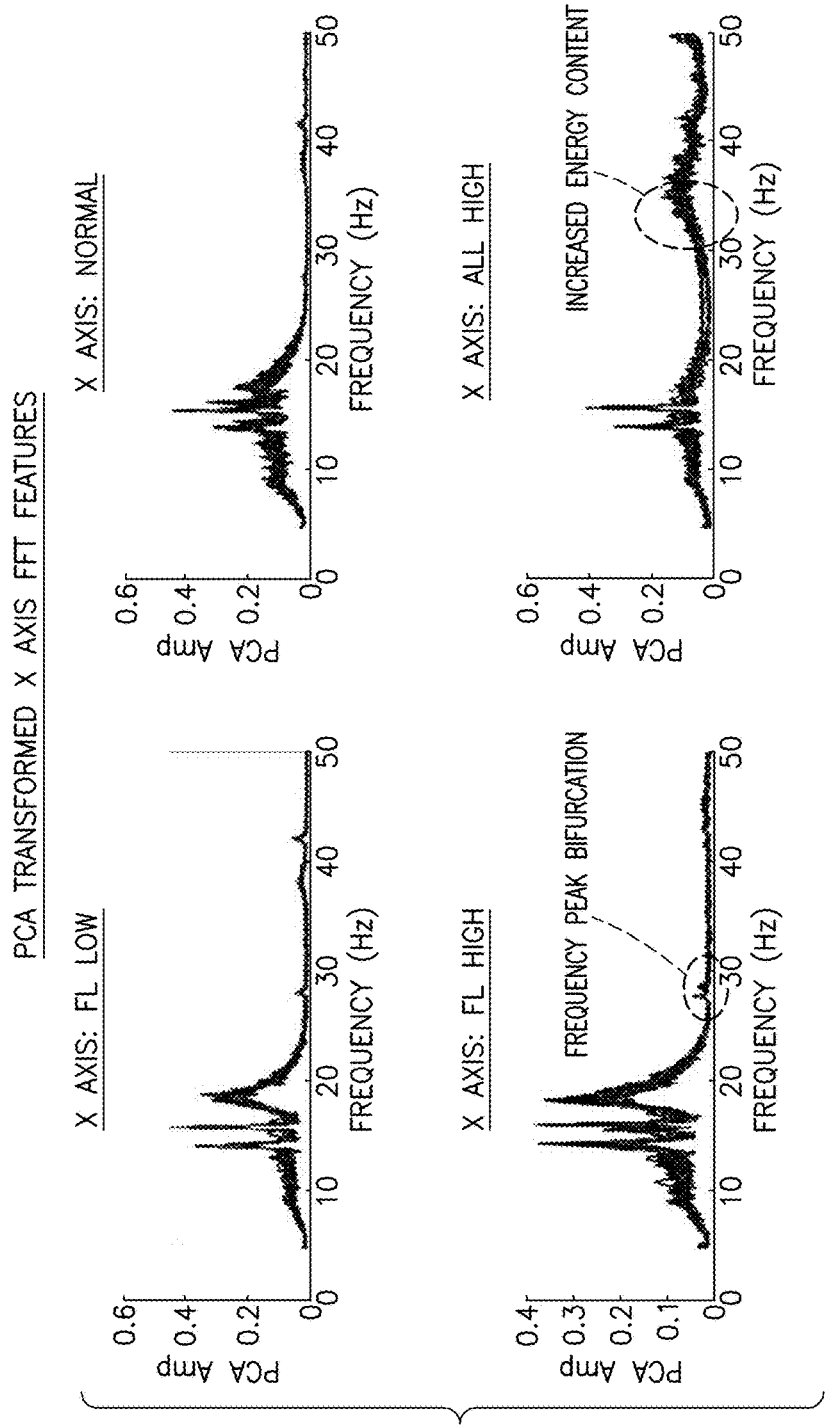
Figure 30B:
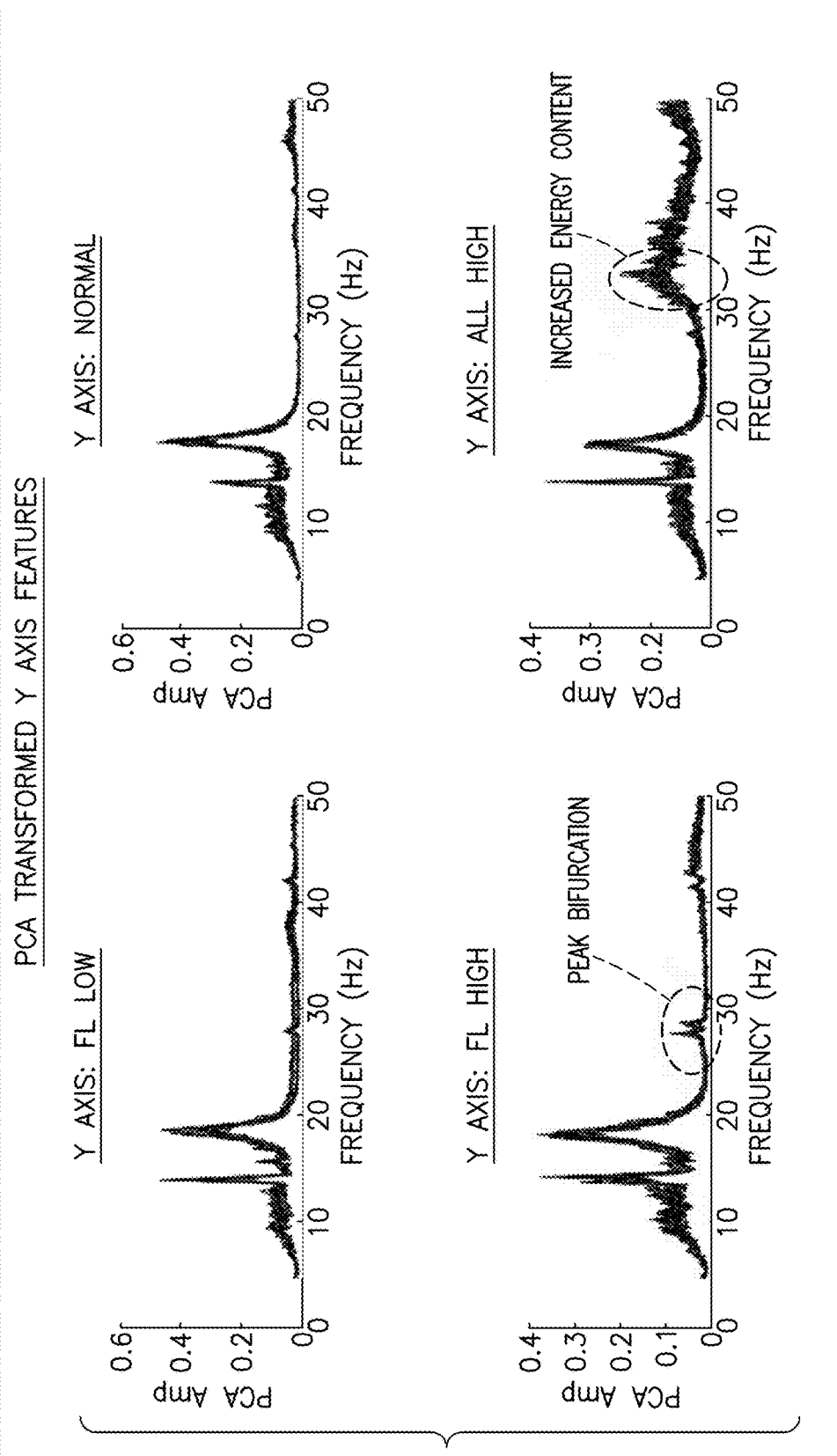

FIG. 30A to FIG. 30C present a comparison of the PCA transformed FFT features for the FL Low, Normal, FL High, and All High test cases for all 3 accelerometer axes. Observe that the peak location and amplitudes in the 25-32 Hz range vary significantly from case to case and can be useful as features for machine learning implementation. In fact, for the FL High case, the single peak appears to have bifurcated into two providing yet another feature of interest. It is believed that this bifurcation may be the result of increased sensitivity of the wobble between the left and right tire due to imperfections in the road surface, such as expansion joints, and as a result of increased front left tire rigidity. The tire rigidity theory is further supported by the amplification of high frequency content in the All High case, which one would expect from the increased sensitivity of all 4 tires due to the increased rigidity. Also missing is the bifurcation effect seen for the All High case. This would be expected as the wobble effect would subside with both front left and right tire being at equally high pressure.

In view of the foregoing, in at least some implementations of system 314, the following features are utilized for a machine learning analysis (of tire pressure and/or tread wear):

$f_{GPS}/f_{ACC}$ where $f_{ACC}$ is the peak frequency in the 10-16 Hz range (this is 1 feature and/or The top 2 frequency peaks and amplitudes in the 25-32 Hz range of the PCA transformed FFT data for the X, Y and Z acceleration axes. The top two may be utilized so as to capture the bifurcation effect observed in the Z acceleration axes for the FL High case. This provides us with a total of 13 features (one ratio and three sets of peak/amplitude pairs).

In this exemplary implementation, the decision tree would be trained based on the 13 features listed above.

In some implementations, the concept of the peak bandwidth feature could be used to determine how uniform tire size is across the four wheels (wide bandwidth means high variability).

In this section, implementation of a supervised learning decision tree algorithm to differentiate between the five tire pressure states is discussed. The division of data for testing and training and the metrics used for quantifying classification accuracy are discussed in this section as well.

Figure 31:
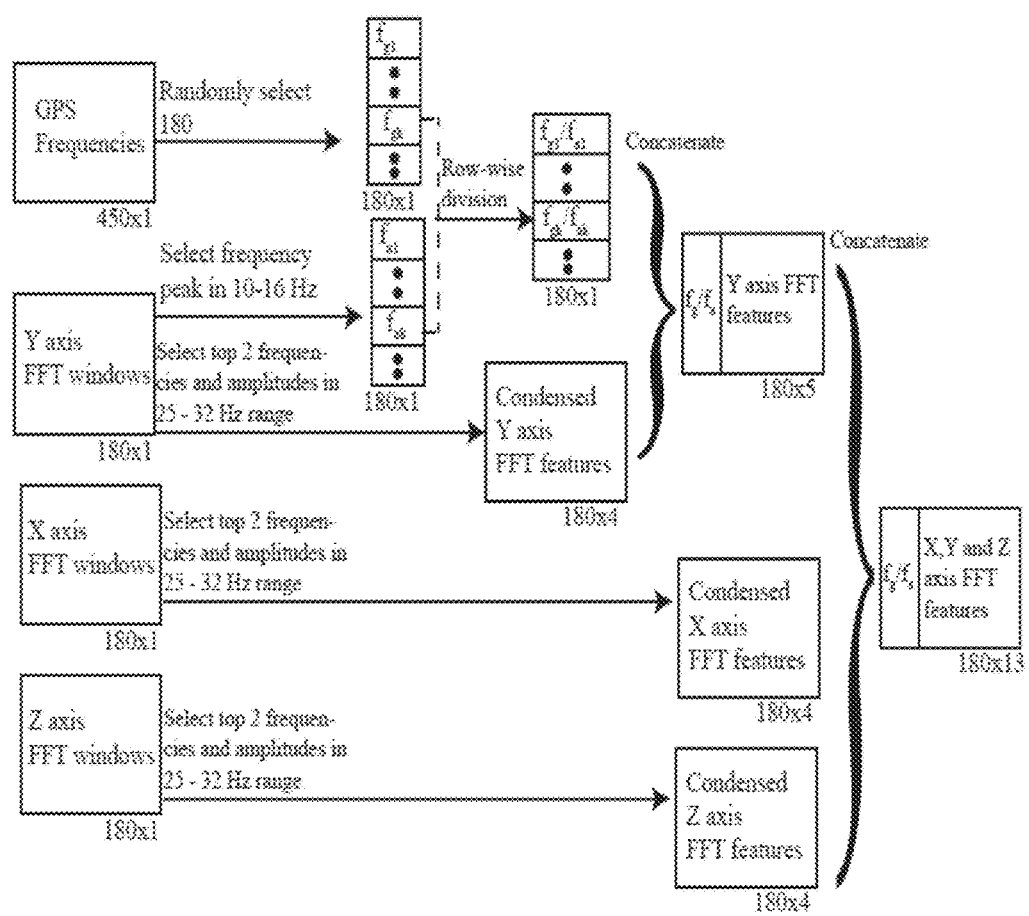
FIG. 31 is a schematic representation of an exemplary feature generation process.

First, a feature matrix was generated. In this regard, FIG. 31 represents a feature generation process for any of the 5 test cases. According to the represented process, the accelerometer data was windowed into 180 FFT feature rows. A vector of 450 GPS tire rotation frequency estimates was also gathered. 180 out of the 450 samples were randomly extracted. From the 180 FFT windows, the following features were extracted:

The peak frequency $f_{ACC}$ in the 10-16 Hz range for the 180 windows of Y axis acceleration. Each of the 180 randomly selected GPS frequency samples was divided by the corresponding $f_{ACC}$ to obtain the frequency ratio $f_{GPS}/f_{ACC}$; and The top 2 frequency peaks and amplitudes in the 25-32 Hz range from the 180 windows of X, Y and Z axis acceleration.

This presented a dataset of 180×13 features for training and testing the decision tree.

Figure 32B:
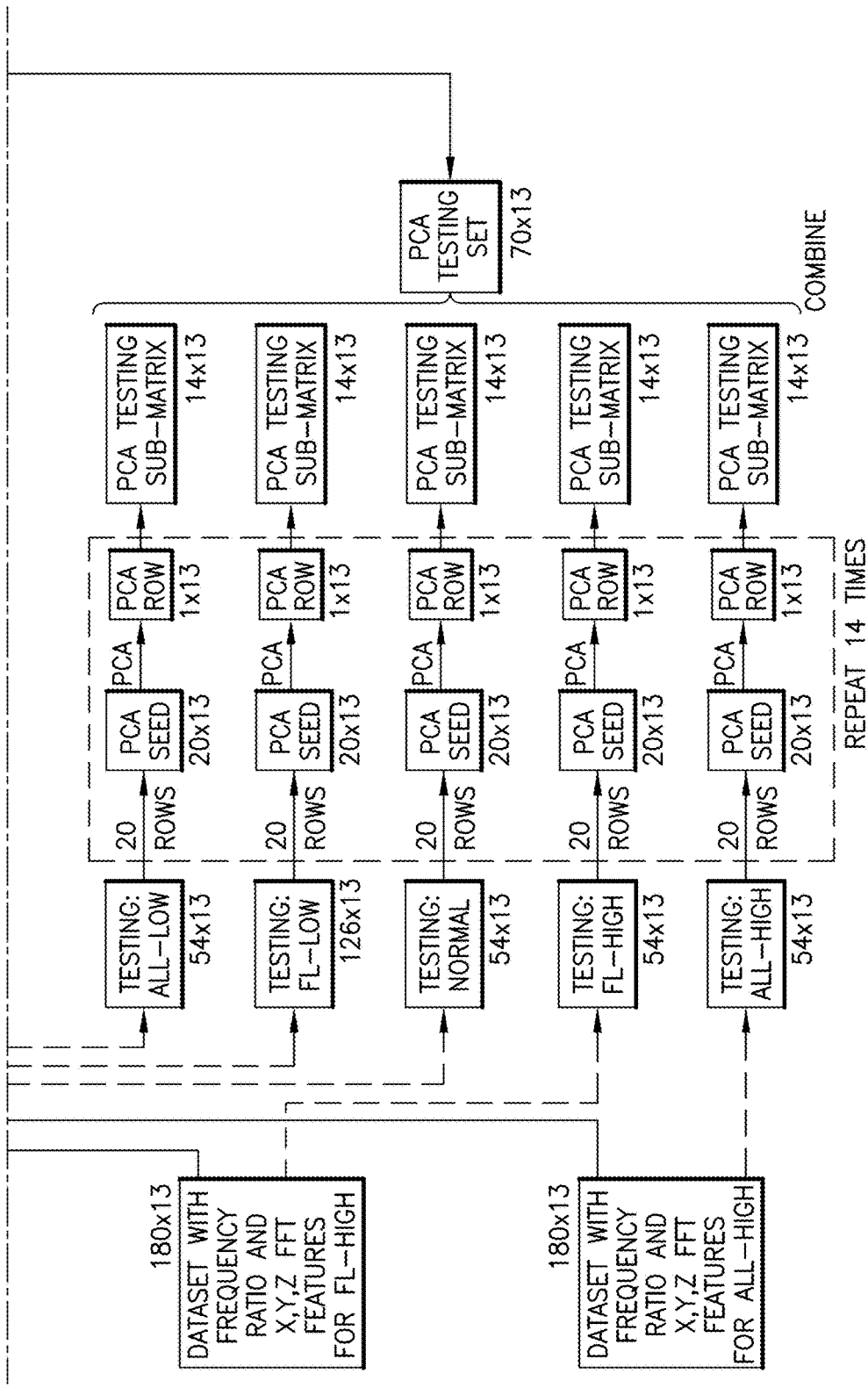

Next, a decision tree algorithm was created. In this regard, the 180×13 dataset for all 5 test cases was randomly divided into testing and training sets as shown in FIG. 32. 70% of the data was randomly selected for training and the remaining 30% is used for testing. Training data was generated by selecting 35 rows randomly from the training set as a seed matrix for PCA. The process was repeated 40 times thus generating a 40×13 training set for each of the 5 test cases. The decision tree was thus trained on a combined matrix of 200×13 samples. Likewise, testing data was generated by selecting 20 rows randomly from the testing set as a seed matrix for PCA. The process was repeated 14 times thus generating a 14×13 testing set for each of the 5 test cases. The decision tree is tested on a combined test matrix of 70×13 samples. The classification accuracy of the decision tree was evaluated by constructing a confusion matrix for the 70 test samples. In the field of machine learning, a confusion matrix is a specific table layout that allows visualization of the performance of an algorithm. Typically, each column of the matrix represents the instances in a predicted class while each row represents the instances in an actual class (or vice versa).

Next, is a discussion of results obtained from implementing a machine learning algorithm disclosed herein to predict any tire pressure issues or the like. Also, what follows is a discussion of the algorithm's sensitivity to road surface conditions.

Figure 34:
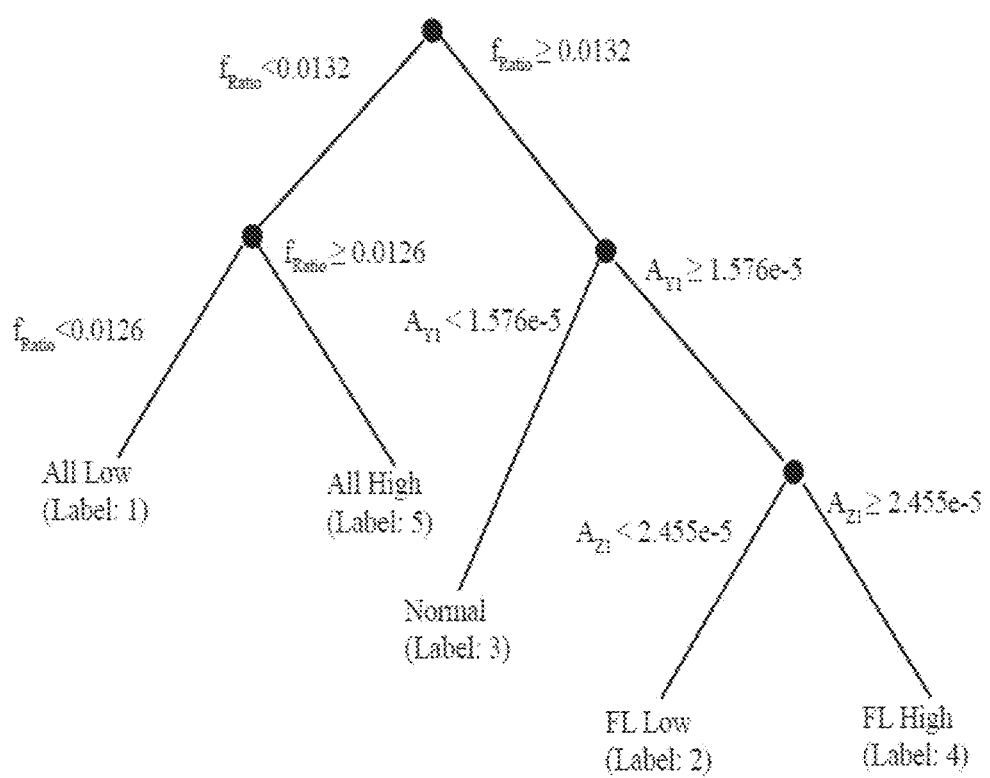
FIG. 34 is a schematic representation of a decision tree.

FIG. 33 presents the confusion matrix generated after implementing the decision tree algorithm discussed above. FIG. 34 illustrates the branching decisions of the tree algorithm. The terminology in FIG. 34 is as follows:

The leaf nodes of the tree correspond to the five test cases, which have been assigned labels 1 through 5 as illustrated in Table. 3.

f ratio corresponds to the $f_{GPS}/f_{ACC}$ feature discussed above.

Ay1 corresponds to the PCA amplitude corresponding to the top Y axis frequency peak in the 25-32 Hz range (e.g., as seen in FIG. 30(b)).

Az1 corresponds to the PCA amplitude corresponding to the top Z axis frequency peak in the 25-32 Hz range as seen in FIG. 30(c).

The branching decisions make logical sense. The tree uses f ratio at the root level to distinguish All Low and All High from the other cases. It also uses f ratio to distinguish between All Low and All High, which is in line with our expectations in view of the discussion above. Looking at FIG. 30(b), it can be observed that using the relatively smaller Ay1 of the Normal case to distinguish it from FL Low, and FL High makes sense as well. Finally, looking at FIG. 30(c), it can be observed that using Az1 to distinguish between FL Low and FL High is valid as well.

The algorithm was run 5 times so as to gather multiple random testing and training datasets. In each case, the algorithm gave results comparable to FIG. 33 with classification accuracies ~90%. Also, the tree consistently made branching decisions based on FIG. 34 across all five runs.

While it was encouraging to note that the algorithm worked well for testing and training data randomly selected from across 15 minutes of logged data, it was also important to examine the sensitivity of the algorithm to road surface conditions. For instance, if the vehicle happened to pass over a stretch of road which is more worn during the first three minutes of the test and then over a freshly paved surface for the next 3 minutes, a different frequency spectrum would be expected. This effect was lost, or rather averaged, in the way the selection of testing and training data was implemented above.

Figure 35A:
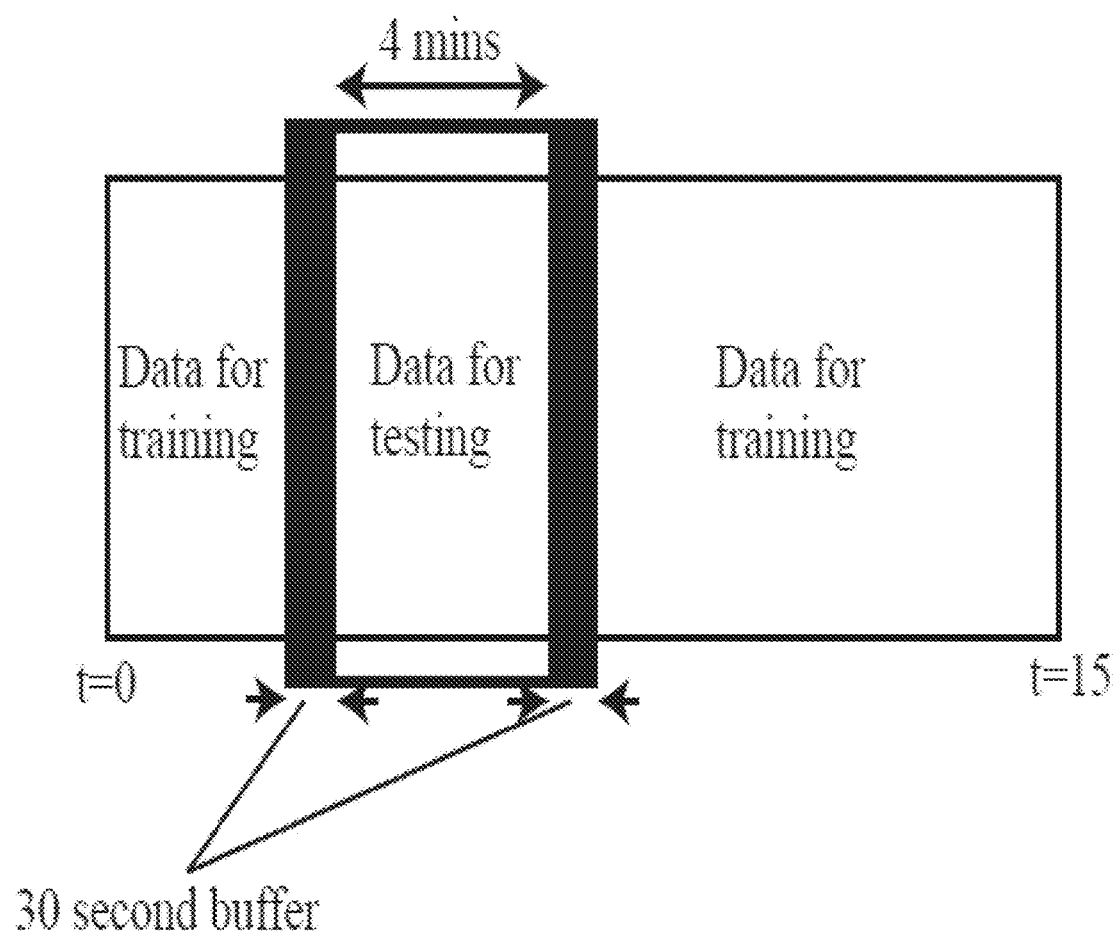
FIGS. 35A and 35B are schematic representations of a sliding time window.
Figure 35B:
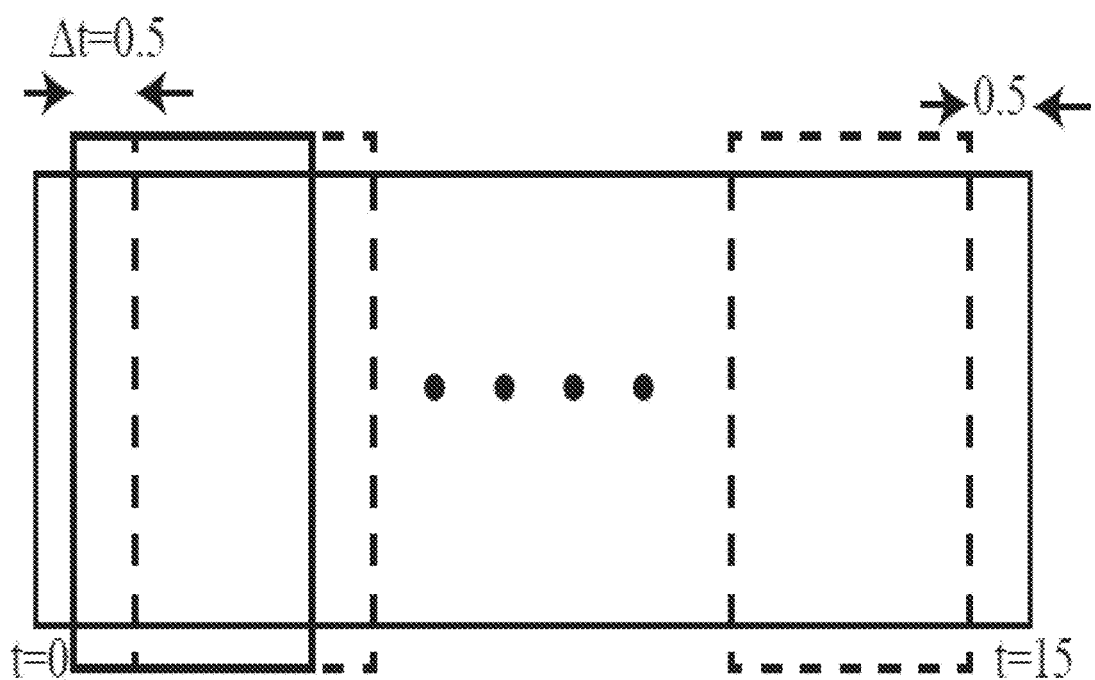

In some implementations, a moving window through the dataset is utilized for selecting testing and training data, as shown in FIG. 35A. The buffer of 30 seconds is to ensure that the testing and training sets do not overlap. The size of the testing window, in the illustrated implementation, was four minutes, indicative of 30% data being used for testing. The training dataset is therefore 7 minutes in size. The moving window began at the t=30 second mark and advanced in increments of 30 seconds as shown in FIG. 35B. Note that up to 20 snapshots partitioning the entire dataset can be obtained using this windowing approach.

Figure 36B:
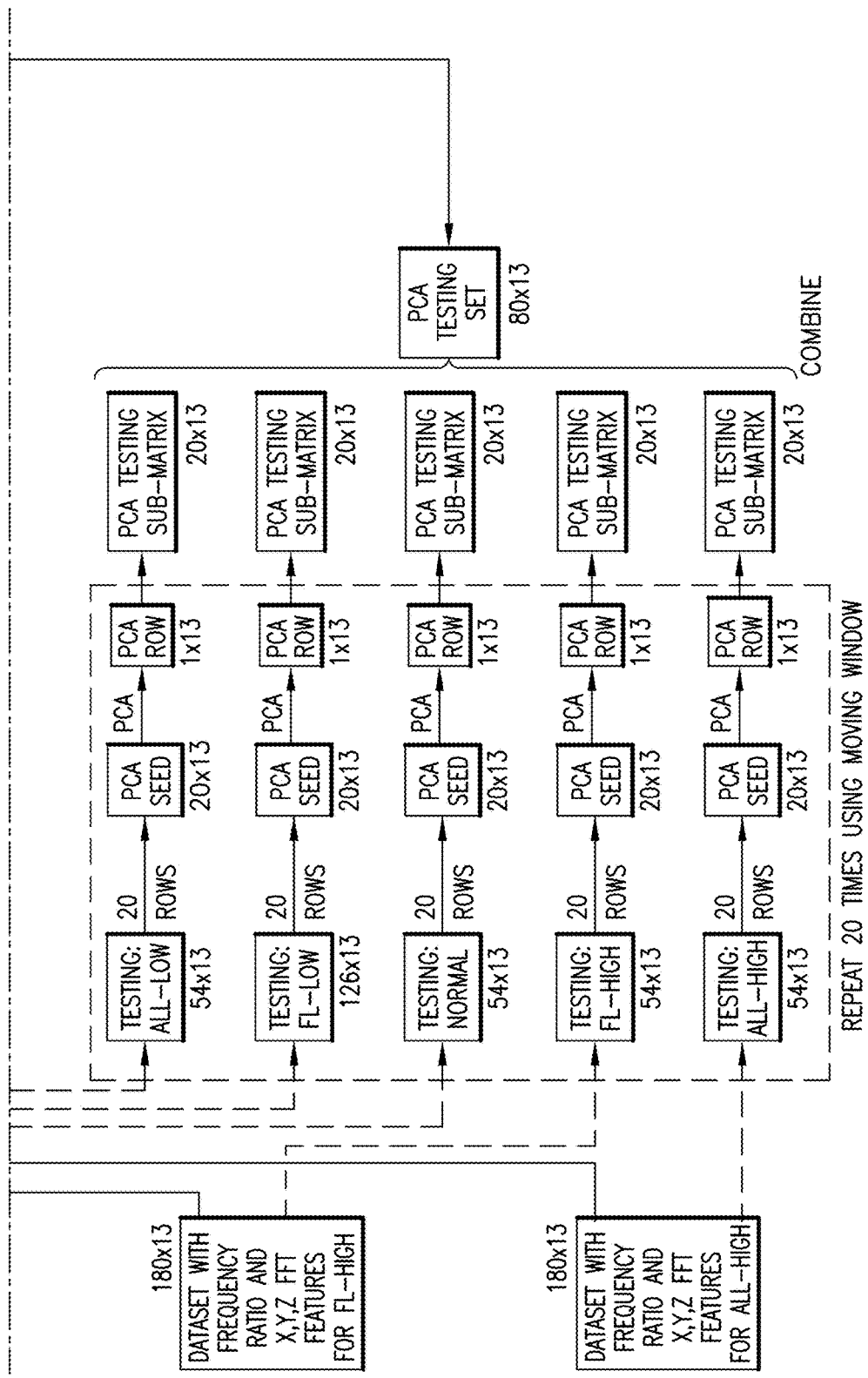

FIG. 36 illustrates the modification of testing and training data using this approach and FIG. 37 shows the results of classification. Although the classification accuracy was reduced somewhat by the time windowing, it was still possible to achieve 80% accuracy in the worst case. The features along which the decision tree makes branching decisions were unchanged from FIG. 34.

Aside from tire pressure, tread wear changes a tire's effective rolling diameter. With suitably high measurement sensitivity, the main feature for pressure classification can be applied to identifying remaining tread depth. The manifestation of tread wear is similar to pressure drops, except that tire roundness is less affected: as tread wears, the effective rolling radius decreases and the distance traveled per rotation decreases. To determine whether the change in frequency is due to a loss in tire pressure or a change in tread depth, in a typical implementation, a time history of ΔF and the number of wheels over or under the nominal diameter are considered. The number of wheels over or under the nominal diameter is the feature that can use bandwidth to provide additional differentiating power (wide bandwidth=more variable tires, or a more substantial Δ in diameter).

If all four wheels are uniform, then there is a systemic pressure or diameter change due to temperature effects or tire wear. A time history or the runtime of the vehicle can differentiate these cases, by eliminating temperature as a possible factor. In the scenario where one tire is out of the target range, this indicates an external factor such as an impact, puncture, or leak is causing the pressure and resultant diameter change.

To illustrate the concept, consider an example tire of size P235/75R15 with a nominal diameter of 734.06 mm and a nominal circumference of 2306.12 mm/revolution. Assume that the nominal diameter is at the midpoint of wear, and that when new, the tire has 8 mm of tread and the tire becomes unsafe at 1.5 mm of tread remaining (a $\Delta d$ of 2·6.5 mm=13 mm). Assuming the tire is inflated sufficiently well so as to be approximated as cylindrical, the maximum tire diameter thus becomes: 734.06 mm+13 mm=747.06 mm, with a related circumference of 2347 mm. The minimum safe tire diameter is 734.06 mm−13 mm=721.6 mm, with a circumference of 2265.3 mm.

At 100 kph, one sees 100 kph I 2347 mm=11.84 Hz for the brand new tires. The old tires are 100 kph/2265.6 mm, or 12.26 Hz. The $\Delta f$ between the new and worn-out tires is thus 0.42 Hz. To identify a frequency change of 0.42 Hz, it may be desirable for the system to have a repeatable sensitivity of approximately 0.2 Hz, which is well within the range one would expect from modern technology. As speed increases, the percentage difference remains the same, but the absolute frequency difference becomes larger. This means that at higher speeds, sensors with lower accuracy/higher noise can still be used to identify tire diameter changes.

Another experiment was conducted to determine if the mobile phone accelerometer could detect a frequency shift of this magnitude. Tire pressure was used as a proxy for tread depth.

This time, a 2014 Honda Insight was used, and the pressure was varied from 27 to 33 PSI to mimic the change in diameter occurring with typical tread wear. The car's tires were size 225/50R17, with a 112.5 mm sidewall. The short sidewall led to high tire stiffness, reducing the impact of tire pressure changes on on-road rolling diameter, keeping the wheels closer to cylindrical. The stiffer sidewall increased vibration transmission from the road surface, which made this vehicle a good worst-case scenario to prove the viability of passive tread depth supervision.

Figure 38:
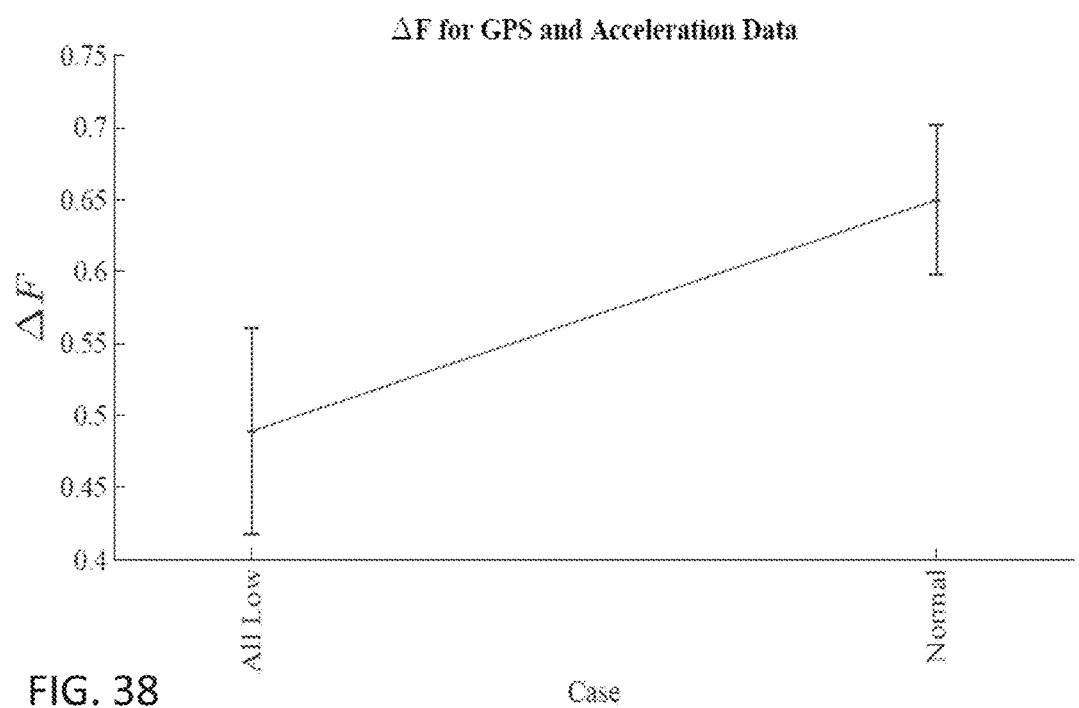
FIG. 38 is a chart plotting AF vs. case.

A similar experimental process was used as described above. The process included warming the vehicle up and recording data for the all normal and all low states. The difference between the wheel's GPS and accelerometer predicted frequencies is shown in FIG. 38.

The iPhone data was sufficient to pick up the difference between the two states with statistical significance ($t_{stat}$95%=17.3 for a 1-sided distribution with 79 d.o.f). Furthermore, the frequency difference between the normal and the All Low case is 0.1608 which is much less than the frequency shift expected due to tire wear. Furthermore, FIG. 38 demonstrates the applicability of the detection theory discussed above for vehicles with low profile tires, demonstrating a high immunity to noise.

The result of this experiment proved viable the concept of passive, non-invasive tread monitoring.

The difference one must be able to detect in order to determine tire wear is within the bounds of differences already demonstrated herein as being able to be detected. Tread depth supervision, therefore, can be accomplished, with the data collection and processing systems and techniques disclosed herein. From the above results, it is possible not only to identify brand new and worn out tires, but also to provide insight and gradation into wear and remaining tire life. In cases where tread depth and environmentally-related pressure changes become difficult to distinguish, vibration transmissibility may be examined to further differentiate. A high peak acceleration amplitude will indicate increased transmission of vibration to the car and therefore a (relatively) high pressure, while a low peak amplitude will show increased damping and a possible low pressure scenario.

A number of embodiments of invention have been described. Nevertheless, it will be understood that various modifications may be made without departing from the spirit and scope of the invention.

For example, the mobile personal computing device can be virtually any kind of computing device that enables or might facilitate the functionalities disclosed herein as being attributable to the mobile personal computing device. Each component of the mobile personal computing device disclosed herein (e.g., the accelerometer, geolocation module, gyroscope, processor, memory etc.) can be completely contained within a single housing, as in an Apple Iphone®, for example. However, it is possible that one or more of those components may be discrete components (separate from the other components), or may be part of some other device (again, separate from the other components). Indeed, the data collection and/or processing could take place within the vehicle, e.g. using in-vehicle accelerometers and in-vehicle geolocation modules.

The mobile personal computing device can be placed anywhere in, on, or in contact with the vehicle. For example, the techniques disclosed herein can, in some instances, be considered effective even if the mobile personal computing device is simply in the driver or a passenger's pocket, or sitting, unsecured in a cup holder, on a car seat, or elsewhere in or on the vehicle.

Typically, much of the data collection and/processing disclosed herein may occur in real-time or near-real time, meaning without any deliberate delay by the system and/or any of its components. However, in some implementations, a delay in processing may occur.

Certain implementations of the systems and techniques disclosed herein can be applied to monitoring the condition of a suspension for a wide range of different types of wheeled vehicle including, for example, cars, taxis, trucks, military vehicles, and even motorcycles.

The data collection is generally performed by the device (or devices) that are moving with the vehicle (e.g., the mobile personal computing device). In some implementations, all of the data processing is done on the device. In some implementations, the collected data is transmitted to the remote processing system (e.g., in the cloud), the remote processing device performs all of the data processing, and only makes the user notification (if there is one) available at the device. In some implementations, the data processing functionalities are shared between the mobile personal computing device and the remote processing system.

The geolocation module can, as described herein, utilize GPS technology or any other convenient locating technologies (relying, e.g., on nearby cell phone towers, WiFi networks or the like).

The mobile personal computing devices may include other sensors and components beyond those disclosed herein. Moreover, it is feasible that at least some of the functionalities and systems disclosed herein may be realized with a mobile personal computing device that includes less than what is disclosed herein.

In various implementations, one or more of the devices disclosed herein may be configured to communicate wirelessly over a wireless communication network via one or more wireless communication protocols including, but not limited to, cellular communication, ZigBee, REDLINK™, Bluetooth, WiFi, IrDA, dedicated short range communication (DSRC), EnOcean, and/or any other suitable common or proprietary wireless protocol.

In some implementations, certain functionalities described herein may be provided by a downloadable software application (i.e., an app). In some implementations, certain functionalities disclosed herein may be provided through or in association with a website.

In various embodiments, the subject matter disclosed herein can be implemented in digital electronic circuitry, or in computer-based software, firmware, or hardware, including the structures disclosed in this specification and/or their structural equivalents, and/or in combinations thereof. In some embodiments, the subject matter disclosed herein can be implemented in one or more computer programs, that is, one or more modules of computer program instructions, encoded on computer storage medium for execution by, or to control the operation of, one or more data processing apparatuses (e.g., processors). Alternatively, or additionally, the program instructions can be encoded on an artificially generated propagated signal, for example, a machine-generated electrical, optical, or electromagnetic signal that is generated to encode information for transmission to suitable receiver apparatus for execution by a data processing apparatus. A computer storage medium can be, or can be included within, a computer-readable storage device, a computer-readable storage substrate, a random or serial access memory array or device, or a combination thereof. While a computer storage medium should not be considered to include a propagated signal, a computer storage medium may be a source or destination of computer program instructions encoded in an artificially generated propagated signal. The computer storage medium can also be, or be included in, one or more separate physical components or media, for example, multiple CDs, computer disks, and/or other storage devices.

The operations described in this specification can be implemented as operations performed by a data processing apparatus (e.g., a processor) on data stored on one or more computer-readable storage devices or received from other sources. The term "processor" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings and described herein as occurring in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Furthermore, some of the concepts disclosed herein can take the form of or be implemented in a computer program product accessible from a non-transitory computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

Other implementations are within the scope of the claims.

What is claimed is:

1. A computer-based method to facilitate detecting wheel imbalance, a tire pressure problem, or excessive tread wear on tires of a moving vehicle, the method comprising:
    collecting, from an accelerometer of a mobile personal computing device that is mounted in the moving vehicle, data that represents vibration that results, at least in part, from the vehicle's motion;
    determining, with a computer-based processor, whether the moving vehicle has wheel imbalance, a tire pressure problem, and/or excessive tire tread wear based at least in part on the vibration data produced by the accelerometer; and
    making a user notification available at the mobile personal computing device at least if the computer-based processor determines that the tire pressure problem or the excessive tire tread wear exists,
    wherein the accelerometer are moving with the vehicle when the data is being collected.

2. The computer-based method of claim 1, wherein determining whether the moving vehicle has wheel imbalance, a tire pressure problem, and/or excessive tire tread wear comprises:
    transforming at least some portion of the data from the accelerometer into a data set in the frequency domain; and applying principal component analysis to the frequency domain data set to produce a PCA data set.

3. The computer-based method of claim 1, wherein determining whether the moving vehicle has wheel imbalance, a tire pressure problem, and/or excessive tire tread wear comprises:
applying a decision tree algorithm to at least a portion of the PCA data set to identify whether a wheel imbalance exists in the vehicle.

4. The computer-based method of claim 3, further comprising:
creating a user notification indicating that a wheel imbalance exists in the vehicle if a wheel imbalance is identified,
wherein the user notification is accessible at least from the mobile personal computing device.

5. The computer-based method of claim 1, wherein the mobile personal computing device comprises a geolocation module configured to produce information about the mobile personal computing device's physical location and corresponding time information,
the method further comprising:
calculating an expected rotational frequency of the vehicle's tires if they were fully inflated, based on time-stamped GPS longitude and latitude data provided by the geolocation device of the mobile personal computing device and information about the vehicle's tires, and
determining an actual rotational frequency of the vehicle's tires.

6. The computer-based method of claim 5, wherein the mobile personal computing device comprises a user interface, the method further comprising:
prompting or enabling a user at the user interface to enter vehicle or tire information that either identifies or enables a look up of tire dimensional data for purposes of determining the expected rotational frequency of the vehicle's tires if they were fully inflated, based on time-stamped GPS longitude and latitude data provided by the geolocation device.

7. The computer-based method of claim 5, further comprising:
determining whether the tire pressure problem or the excessive tire tread wear exists based at least in part on whether there is a mismatch between the expected rotational frequency and the actual rotational frequency.

8. The computer-based method of claim 5 further comprising:
using the expected rotational frequency and the actual rotational frequency, and other features, to identify a specific tire of the vehicle with a problem.

9. The computer-based method of claim 5, further comprising:
using a time history or a temperature correction factor to determine whether the wheel imbalance, the tire pressure problem, or the excessive tire tread wear is systemic or endemic.

10. The computer-based method of claim 1 providing real time or near-real time condition monitoring for potential wheel imbalance, tire pressure, or tire tread wear issues.

11. The computer-based method of claim 2, wherein the mobile personal computing device further comprises a geo-location module to produce time stamped information about the mobile personal computing device's physical location, the method further comprising:
deriving, from the time stamped physical location information, a speed of the vehicle.

12. The computer-based method of claim 11, further comprising:
excluding from consideration in assessing wheel imbalance, tire pressure, and/or excessive tire tread wear, any vibration data that was produced by the accelerometer while the vehicle was moving at a speed outside a specified range.

13. The computer-based method of claim 1, wherein the mobile personal computing device further comprises:
a gyroscope to produce information about the mobile personal computing device's movements, including information that indicates or that can be used to determine whether the vehicle is turning or not,
the method further comprising:
determining, from the information produced by the gyroscope, if the vehicle is or was turning, and
excluding from consideration in assessing wheel imbalance any vibration data that was collected while the vehicle was turning.

14. A system to facilitate detecting wheel imbalance, a tire pressure problem, or excessive tread wear on tires of a moving vehicle, the system comprising:
a mobile personal computing device mounted inside the moving vehicle, wherein the mobile personal computing device comprises an accelerometer, such that the mobile personal computing device and the accelerometer are configured to move with the vehicle and produce data that represents vibration that results, at least in part, from the vehicle's motion;
a computer-based processor and computer-based memory that stores instructions that, when executed by the computer-based processor, cause the computer-based processor to:
determine, based at least in part on the vibration data produced by the accelerometer, whether the moving vehicle has a wheel imbalance, a tire pressure problem, and/or excessive tire tread wear; and
make a user notification available at the mobile personal computing device at least if the computer-based processor determines that the tire pressure problem or the excessive tire tread wear exists.

15. The system of claim 14, wherein the instructions further cause the computer-based processor to:
transform at least some portion of the vibration data produced by the accelerometer into a data set in the frequency domain; and
apply principal component analysis to the frequency domain data set to produce a PCA data set.

16. The system of claim 15, wherein the instructions further cause the computer-based processor to:
apply a decision tree algorithm to at least a portion of the PCA data set to identify whether a wheel imbalance exists in the vehicle.

17. The system of claim 16, wherein the instructions further cause the computer-based processor to:
create a user notification indicating that a wheel imbalance exists in the vehicle if the computer-based processor determines that the wheel imbalance exists,
wherein the user notification is accessible at least from the mobile personal computing device.

18. The system of claim 14, wherein the mobile personal computing device further comprises:
a geolocation module configured to produce information about the mobile personal computing device's physical location and corresponding time information, wherein the computer processor is further configured to:
    calculate an expected rotational frequency of the vehicle's tires if they were fully inflated, based on time-stamped GPS longitude and latitude data provided by the geolocation device of the mobile personal computing device and information about the vehicle's tires, and
    determine the actual rotational frequency of the vehicle's tires.

19. The system of claim 18, wherein the mobile personal computing device further comprises a user interface,
    wherein the system is configured to prompt or enable a user at the user interface to enter tire information that either identifies or enables a look up of tire dimensional data for purposes of determining the expected rotational frequency of the vehicle's tires if they were fully inflated, based on time-stamped GPS longitude and latitude data provided by the geolocation device.

20. The system of claim 18, wherein the computer-based processor is configured to determine whether there is a tire pressure or tread wear issue based at least in part on whether there is a mismatch between the expected rotational frequency and the actual rotational frequency.

21. The system of claim 20, wherein the system is configured to notify the user about a tire pressure or tread wear problem if the computer-based processor determines that there is a tire pressure or tread wear issue.

22. The system of claim 18, wherein the computer-based processor is configured to use the expected rotational frequency and the actual rotational frequency, and other features, to identify a specific tire with a problem.

23. The system of claim 18, wherein the computer-based processor is configured to use a time history or temperature correction factor to determine whether the wheel imbalance, the tire pressure problem, or the excessive tire tread wear is systemic or endemic.

24. The system of claim 14, wherein the mobile personal computing device further comprises:
    a geolocation module to produce time-stamped information about the mobile personal computing device's physical location,
    wherein the instructions further cause the computer-based processor to:
        derive, from the time-stamped physical location information, a speed of the vehicle, and
        exclude from consideration in assessing wheel imbalance any vibration data that was collected while the vehicle was moving at a speed outside a specified range.

25. The system of claim 14, wherein the mobile personal computing device further comprises:
    a gyroscope to produce information about the mobile personal computing device's movements, including information that indicates or that can be used to determine whether the vehicle is turning or not; and
    wherein the instructions further cause the computer-based processor to:
        determine, from the information produced by the gyroscope, if the vehicle is or was turning, and
        exclude from consideration in assessing wheel imbalance any vibration data that was produced while the vehicle was turning.

26. A method comprising:
collecting, from an accelerometer of a mobile personal computing device in a moving vehicle, data that represents vibration that results, at least in part, from the vehicle's motion; and
transforming at least some portion of the vibration data from the accelerometer into a data set in the frequency domain;
applying principal component analysis to the frequency domain data set to produce a PCA data set; and
applying a decision tree algorithm to at least a portion of the PCA data set to identify whether the vehicle has a fault condition that might warrant user attention based at least in part on the vibration data produced by the accelerometer; and
making a user notification available at the mobile personal computing device.

\* \* \* \* \*